US008732734B2

(12) United States Patent
Pfeffer et al.

(10) Patent No.: US 8,732,734 B2
(45) Date of Patent: May 20, 2014

(54) METHODS AND APPARATUS SUPPORTING THE RECORDING OF MULTIPLE SIMULTANEOUSLY BROADCAST PROGRAMS COMMUNICATED USING THE SAME COMMUNICATIONS CHANNEL

(75) Inventors: Howard Pfeffer, Reston, VA (US); Kenneth Gould, Oakton, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 1437 days.

(21) Appl. No.: 11/681,776

(22) Filed: Mar. 3, 2007

(65) Prior Publication Data
US 2008/0216136 A1    Sep. 4, 2008

(51) Int. Cl.
 H04N 7/16    (2011.01)
(52) U.S. Cl.
 USPC .................................................. 725/1; 725/2
(58) Field of Classification Search
 USPC ........... 725/134, 142, 58, 38, 39, 46, 25, 104, 725/1, 2; 386/83
 See application file for complete search history.

(56) References Cited

U.S. PATENT DOCUMENTS

| | | | |
|---|---|---|---|
| 5,414,756 A | 5/1995 | Levine | |
| 6,249,320 B1 | 6/2001 | Schneidewend et al. | |
| 6,714,722 B1 * | 3/2004 | Tsukidate | 386/83 |
| 6,718,552 B1 | 4/2004 | Goode | |
| 6,857,132 B1 | 2/2005 | Rakib et al. | |
| 6,978,471 B1 | 12/2005 | Klopfenstein | |
| 6,993,782 B1 | 1/2006 | Newberry et al. | |
| 7,113,230 B1 * | 9/2006 | Genovese et al. | 348/731 |
| 7,181,128 B1 * | 2/2007 | Wada et al. | 386/83 |
| 7,185,355 B1 | 2/2007 | Ellis et al. | |
| 7,471,876 B2 * | 12/2008 | Tsukidate | 386/83 |
| 2002/0019984 A1 * | 2/2002 | Rakib | 725/111 |
| 2002/0174430 A1 | 11/2002 | Ellis et al. | |
| 2005/0229213 A1 * | 10/2005 | Ellis et al. | 725/58 |
| 2006/0218604 A1 | 9/2006 | Riedl et al. | |
| 2006/0248558 A1 | 11/2006 | Barton et al. | |
| 2008/0066106 A1 | 3/2008 | Ellis et al. | |
| 2008/0222681 A1 * | 9/2008 | Kwon | 725/46 |

* cited by examiner

*Primary Examiner* — Nasser Goodarzi
*Assistant Examiner* — Hyun Hong
(74) *Attorney, Agent, or Firm* — Straub & Pokotylo; Michael P. Straub; Stephen T. Straub

(57) ABSTRACT

A user recovers and records multiple programs communicated simultaneously using a communications channel, e.g., QAM communications channel. The simultaneous communication may be by communicating, e.g., an MPEG-2 transport stream including data corresponding to multiple programs through a corresponding to QAM communications channel. Thus a user device, e.g., a set top box, is able to receive and record programs corresponding to multiple simultaneously broadcast programs using a single tuner. This allows a device to receive and record or display more programs at any given time, than the number of QAM tuners and/or receivers in the user device. Novel user interface features which facilitate a user's ability to identify and record multiple programs corresponding to a QAM channel are also described. Methods and apparatus for determining program to communication channel mappings based on user program recordation information are also described.

34 Claims, 21 Drawing Sheets

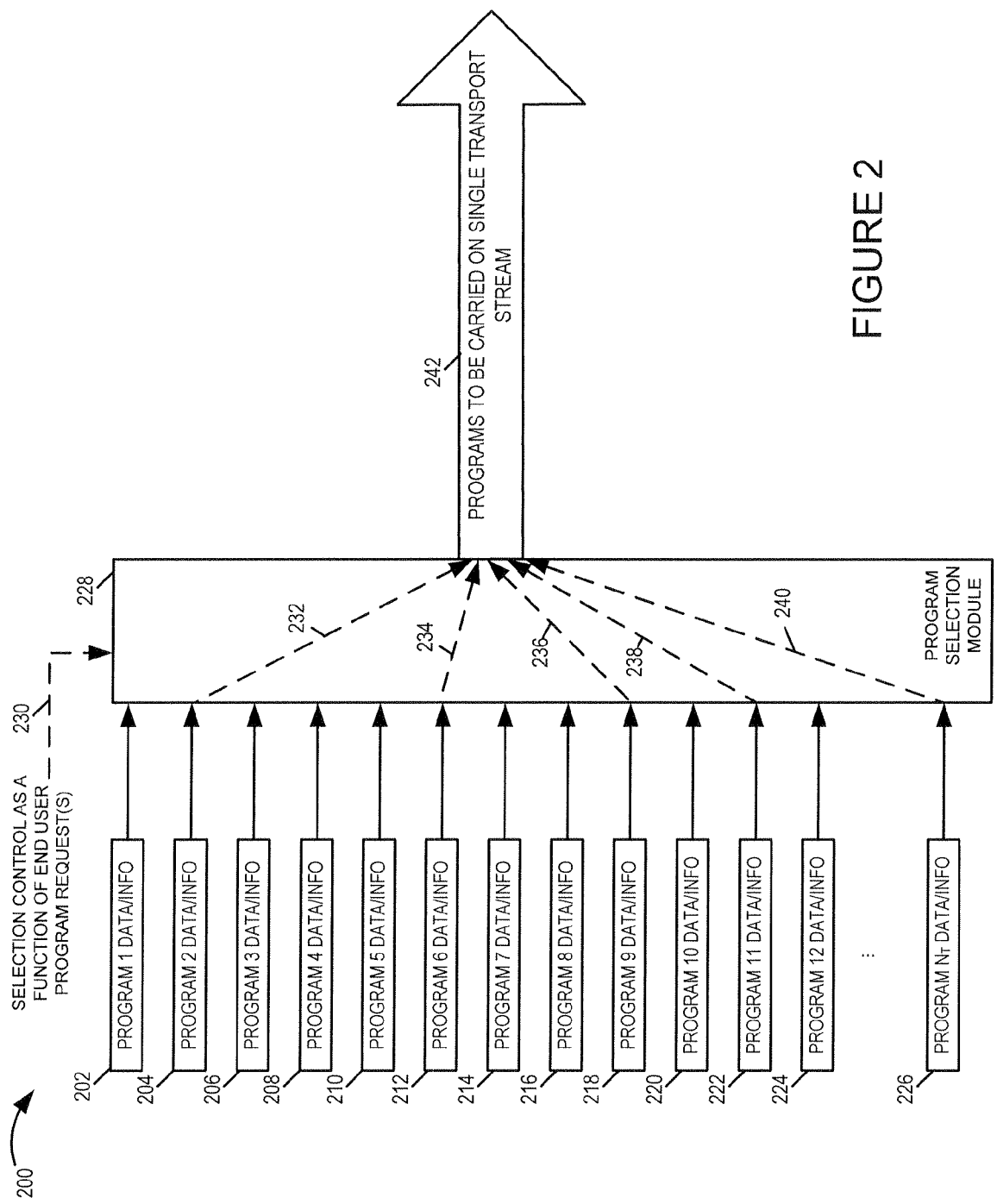

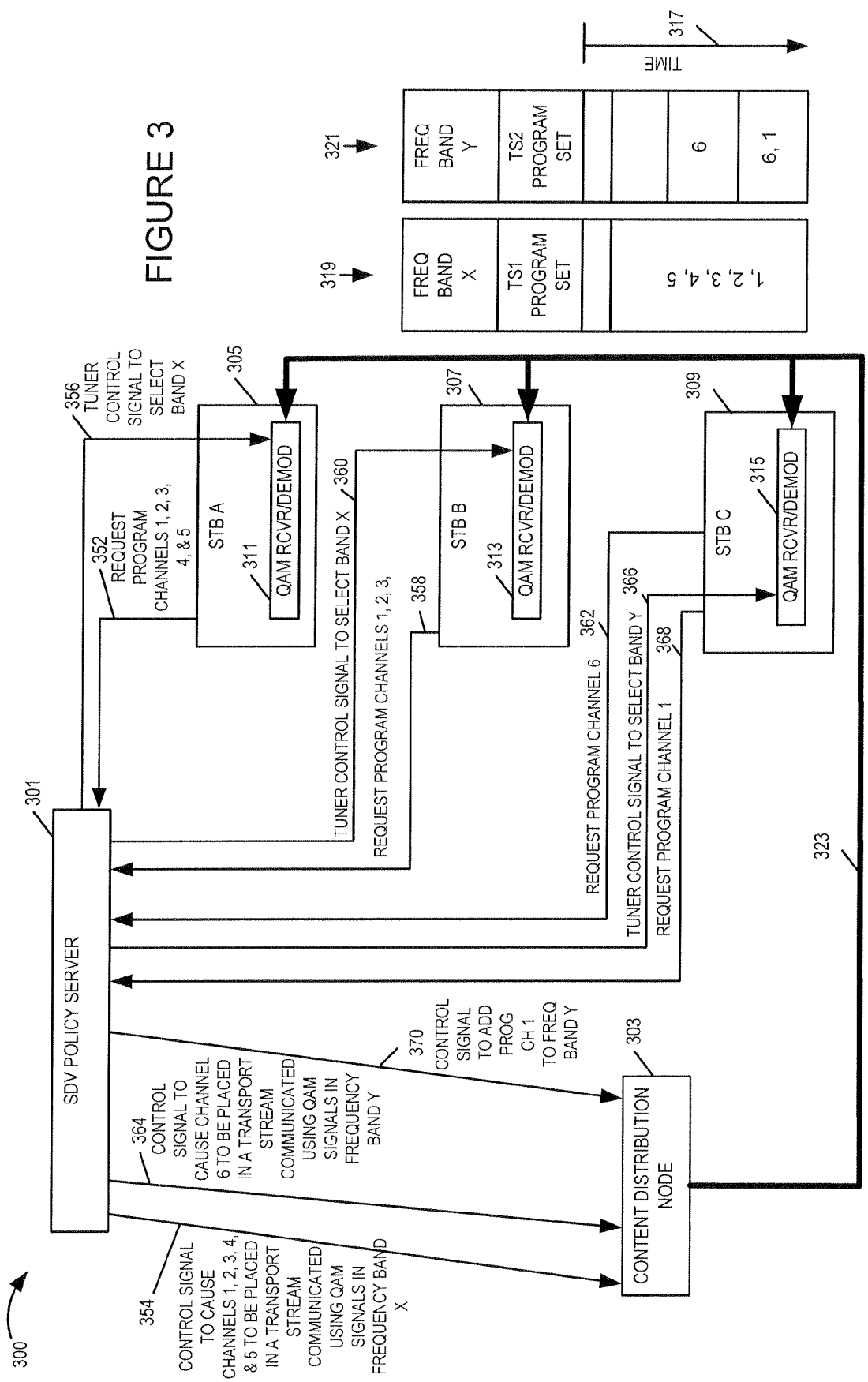

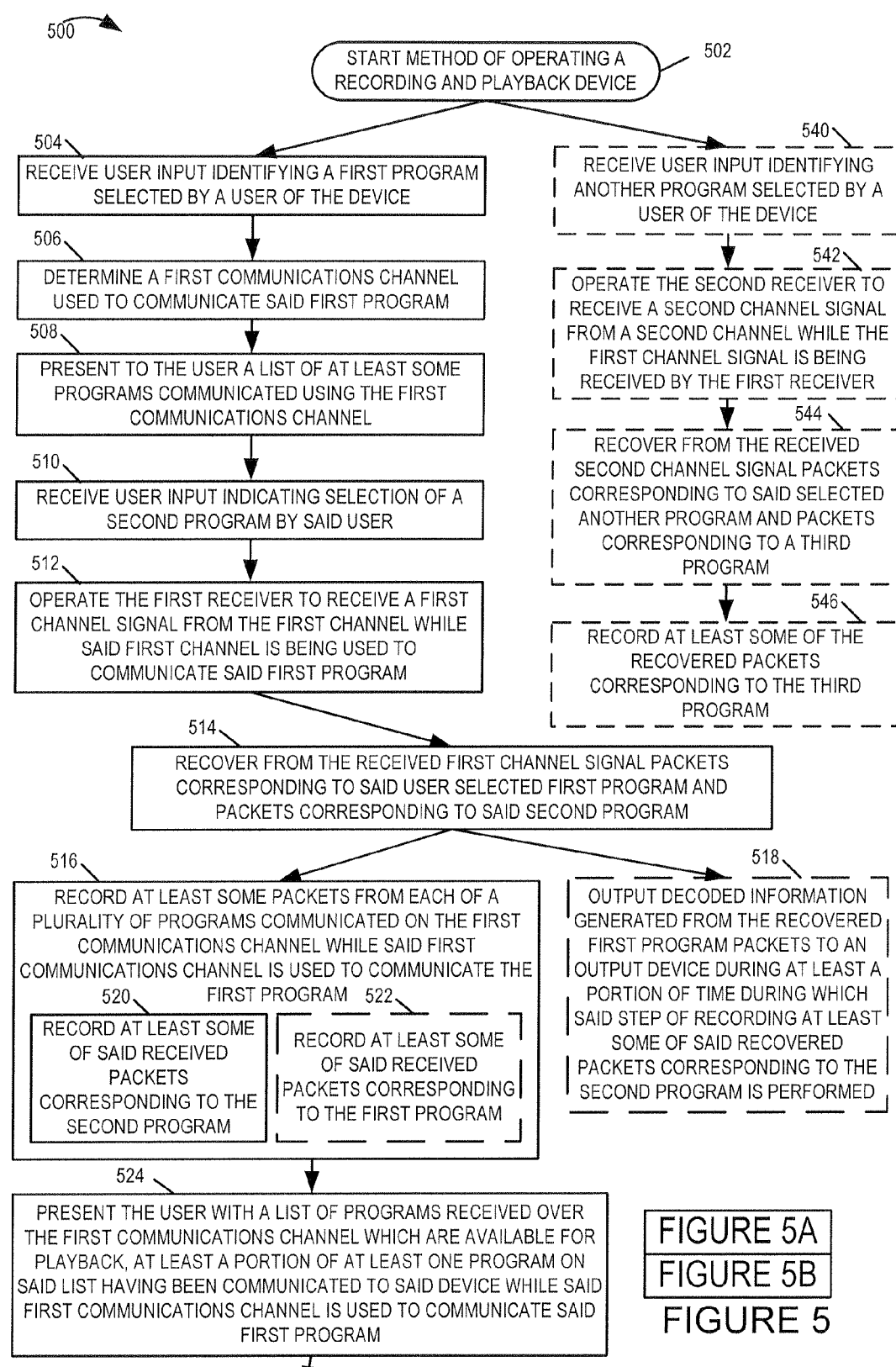

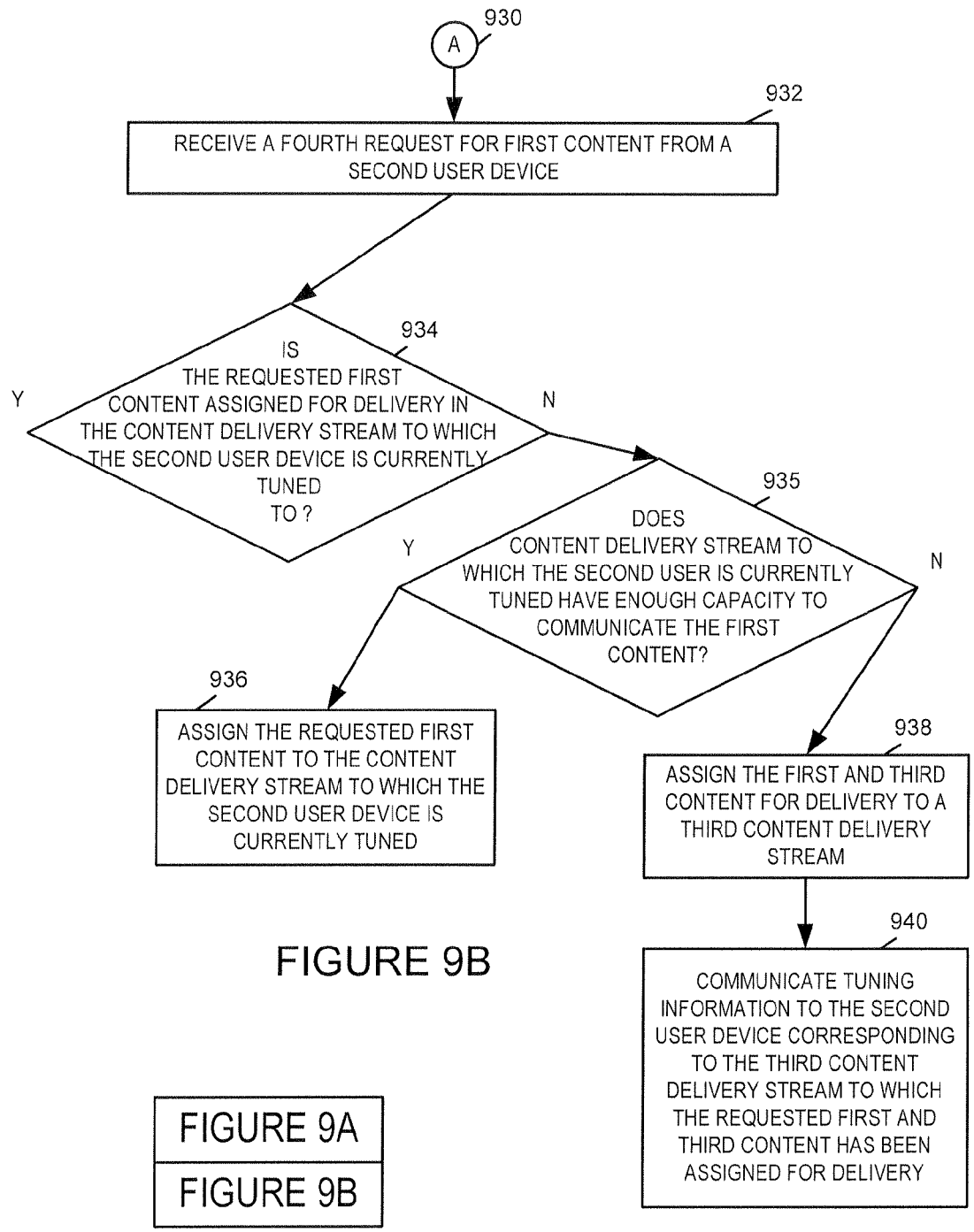

METHODS AND APPARATUS SUPPORTING THE RECORDING OF MULTIPLE SIMULTANEOUSLY BROADCAST PROGRAMS COMMUNICATED USING THE SAME COMMUNICATIONS CHANNEL

FIELD OF THE INVENTION

The present invention is directed to improved content delivery methods and apparatus and, more particularly, to video content delivery methods and apparatus which allow for receiving, recording and/or viewing multiple programs communicated at the same time, e.g., with multiple programs being communicated and recovered from the same communications channel, e.g., a single QAM communications channel.

BACKGROUND

A typical set top box (STB) has a limited number of RF tuners in it, e.g., one or two such tuners. Each tuner allows the STB to tune to one communications channel, e.g., QAM channel at a time. Normally one program, e.g., TV program or movie, is recovered and displayed or recorded from each communications channel. Thus, in many known systems, a STB is designed to support recovery and recording and/or display of a number of programs up to the number of tuners in the STB. A STB has only two RF tuners then, with existing implementations, it can typically only record two different program channels simultaneously, or record one program channel while it viewing another program channel.

STBs are increasingly being paired with recording devices and/or include data storage capability which can be used to record and playback programs at a later time.

As the number of television and other program channels continues to increase, customers are faced with the increasing potential that programs of interest to the customer will be broadcast during the same time slots, on the same or different program channels. Given that set top boxes frequently only include one or two tuners, customers are frequently presented with more programs, movies or other content of interest being broadcast in a given time slot than there are tuners in the customer's STB. This presents the customer with the dilemma of having to use multiple STBs and corresponding recording devices if the customer desires to record more programs during a given time period than there are tuners in the customer's individual STB.

From a content provider's perspective, in order to provide customers an opportunity to record or view content to the extent desired, the content provider may have to repeat a broadcast of one or more programs to provide multiple recording/viewing opportunities to allow customers adequate opportunity to view/record the communicated content. Such repeated transmissions can be an inefficient use of communications resources since the repeated transmission of one communication may preclude the communication of new content or another program since communications bandwidth is a limited resource.

While the need to retransmit content can be inefficient in the case of broadcast programs such as television programs, the inefficient use of communications bandwidth can be particularly costly in the case of content delivery in the case of on demand or premium content delivery. In such applications the number of communications channels available for on-demand content or premium events may be relatively limited and the need to repeatedly transmit a title or other program may result in foregoing revenue that could have been obtained by delivering additional content, e.g., on demand or on a premium channel.

In view of the above discussion, it should be appreciated that it would be desirable if the number of different programs which could be simultaneously received and recorded or viewed by a customer could be increased. Adding tuners to STBs may be one way of achieving this objective. However, the cost of adding additional tuners can be cost prohibitive given the price sensitivity many consumers exhibit with regard to consumer electronics. Furthermore, given the large number of STBs deployed by a cable company and/or other content provider such as satellite providers, the cost of adding one or more tuners to each of a large number of STBs can represent a significant investment which may or may not be justified by the increased efficiency and/or premium channel or pay per view revenues that may be made possible by the additional hardware.

It should also be appreciated that there is a need for improved methods and/or apparatus that can be used to allow a set top box or other device to receive multiple programs at the same time and then record or display the programs. It would be highly desirable if the number of programs which could be received during a given time period and then recorded or displayed could exceed the number of tuners in the device, e.g., STB or other receiver, at the customer's premises.

In addition to improved methods and/or apparatus for implementing customer premise devices, such as STBs and/or satellite receivers, it may be desirable if improved methods of communicating programs to the customer premise devices could be devised which could be used in conjunction with improved customer device methods to make more efficient use of limited communications resources available for content delivery. While improved delivery methods are desirable, it would be particularly advantageous if, in at least some embodiments, the improved delivery methods did not interfere with the operation of currently deployed set top boxes or receivers.

SUMMARY

Various embodiments of the present invention are directed to methods and apparatus for the delivery of content, e.g., video program content, to users and for implementing and/or using customer premise equipment such as, e.g., STBs and satellite receivers. Various features of the present invention are directed to customer premise device methods and apparatus. Some exemplary methods and apparatus allow a customer premise device, e.g., a set top box, to receive and then record and/or display more programs than the customer premise device includes tuners. Other features of the invention are directed to improved content delivery methods, e.g., method of grouping and/or allocating programs to communications channels for delivery to facilitate recording of multiple programs at the same time without the need for a large number of tuners.

The methods and apparatus of the present invention take advantage of a communications channel's ability to support a data rate that allows multiple programs to be delivered using the same communications channel during a program delivery period. For example, a single QAM communications channel may support the delivery of content corresponding to multiple program channels at the same time. Thus, a single QAM channel may deliver program content corresponding to, e.g., four or more programs or titles at the same time, e.g., by delivering the content corresponding to the different programs in a multiplexed content delivery stream. While in some previous systems the content corresponding to a single program corresponding to a communications channel, e.g., a QAM channel would be recorded or displayed, in accordance with the invention the content corresponding to multiple programs communicated using the same channel are recorded and/or displayed. Thus, the number of programs which can be recorded and/or displayed is not limited to the number of tuners since individual communications channels to which a tuner may be tuned can be used to provide data corresponding to multiple programs.

Various embodiments of the present invention are directed to novel user interface menus identifying programs currently available to select for recording and/or programs currently unavailable for recording, e.g., as a function of program to QAM channel mapping information, current QAM receiver tuning, and/or STB device capability information. Some such user interface menus include information identifying groupings of programs mapped onto QAM communications channels. This facilitates a user's ability to select multiple programs for recoding at the same time, e.g., with the recording being possible as a result of the group of programs being received by the same QAM tuner.

The user interface may dynamically modify the illustrated groupings in response to user program recording selections as the selection of one or more programs limits the additional programs which may be recorded during the same communications time period.

In addition to supporting various user interface features and for allowing multiple programs corresponding to a single communications channel to be recorded at the same time, various features of the present invention are directed to determining or setting program to communications channel mappings as a function of program recordation information.

For example, in some embodiments, customer STBs in different geographic regions provide information to one or more head end indicting the programs being recorded, and/or are to be recorded, at particular set top boxes. This recording information is then used to determine or set future program channel to mappings in the region from which the recording information was received. Based on the received information, programs are grouped to channels based on the probability that a customer is likely to want to record more than one program assigned to a channel. For example, westerns may be grouped to one channel based on information indicating that customers have recorded one western are more likely to record other westerns than, say, a football game. Similarly sporting related programs may be grouped together on a QAM channel under the assumption and/or received past recording information indicating that customers who recorded one sporting event tend to want to record other sporting events/programs as well.

Different geographic regions may exhibit different program recording group tendencies. Accordingly, based on past recording information for different geographic regions, the program to channel mapping may be set differently to enhance the probability that customers in a particular geographic region will be able to record multiple programs they find of interest from a communications channel.

While various embodiments have been discussed in the summary above, it should be appreciated that not necessarily all embodiments include the same features and some of the features described above are not necessary but can be desirable in some embodiments. Various additional features, advantages, and/or embodiments of the present invention are discussed in the detailed description which follows.

BRIEF DESCRIPTION OF THE FIGURES

FIG. 2 illustrates a feature of various embodiments of the present invention, in which the selection of programs to be carried by a transport stream is a function of end user program selection.

FIG. 3 is a drawing illustrating exemplary end user program selection, control signaling, transport stream construction, and content delivery in accordance with various embodiments of the present invention.

FIG. 5 comprising the combination of FIG. 5A

DETAILED DESCRIPTION

Various exemplary methods and apparatus of the present invention will now be discussed and described with reference to the figures.

Figure 1A:
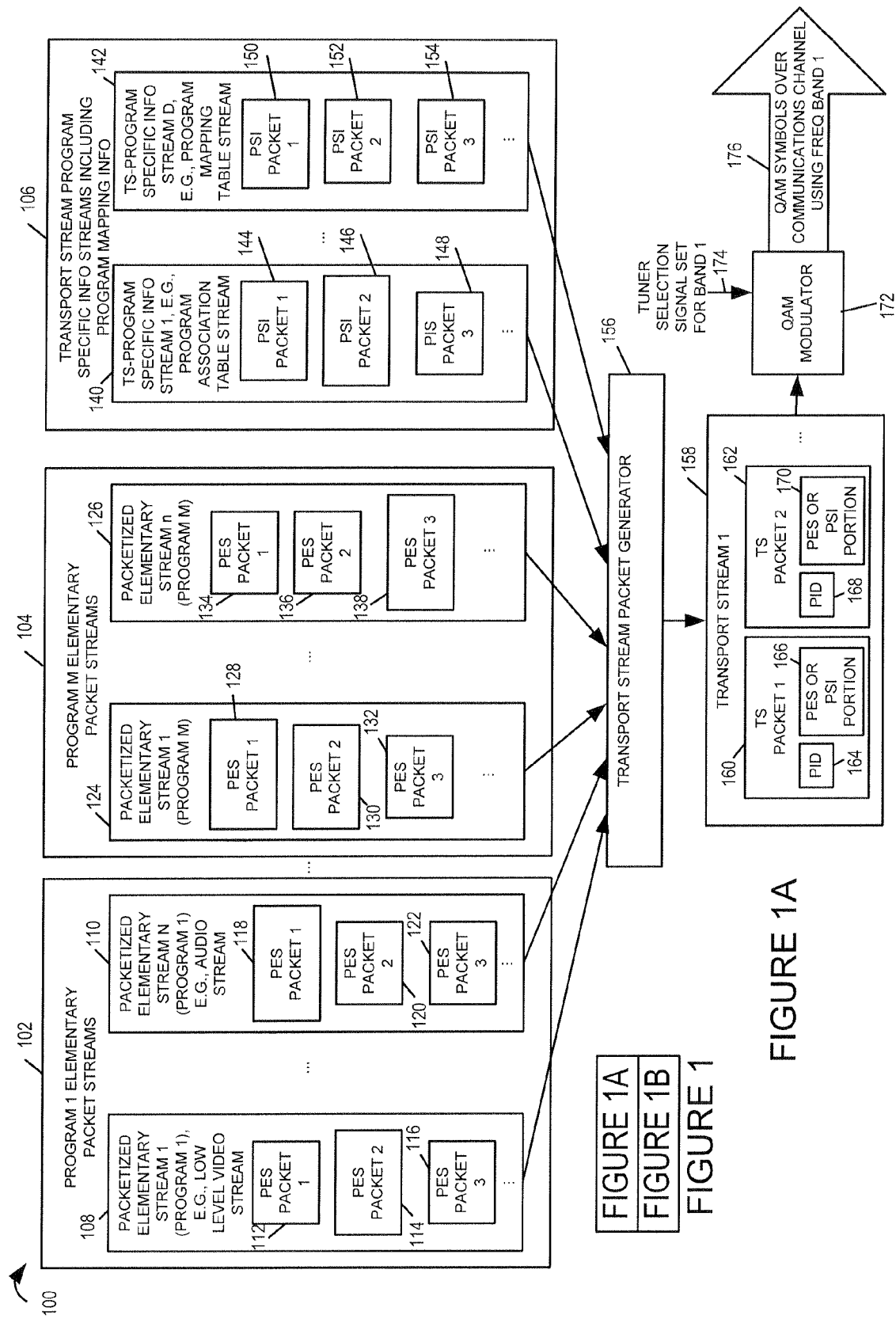
FIG. 1 comprising the combination of FIG. 1A
FIG. 1B is a drawing illustrating exemplary communication, recording and playing of program information in accordance with various embodiments of the present invention.
Figure 1B:
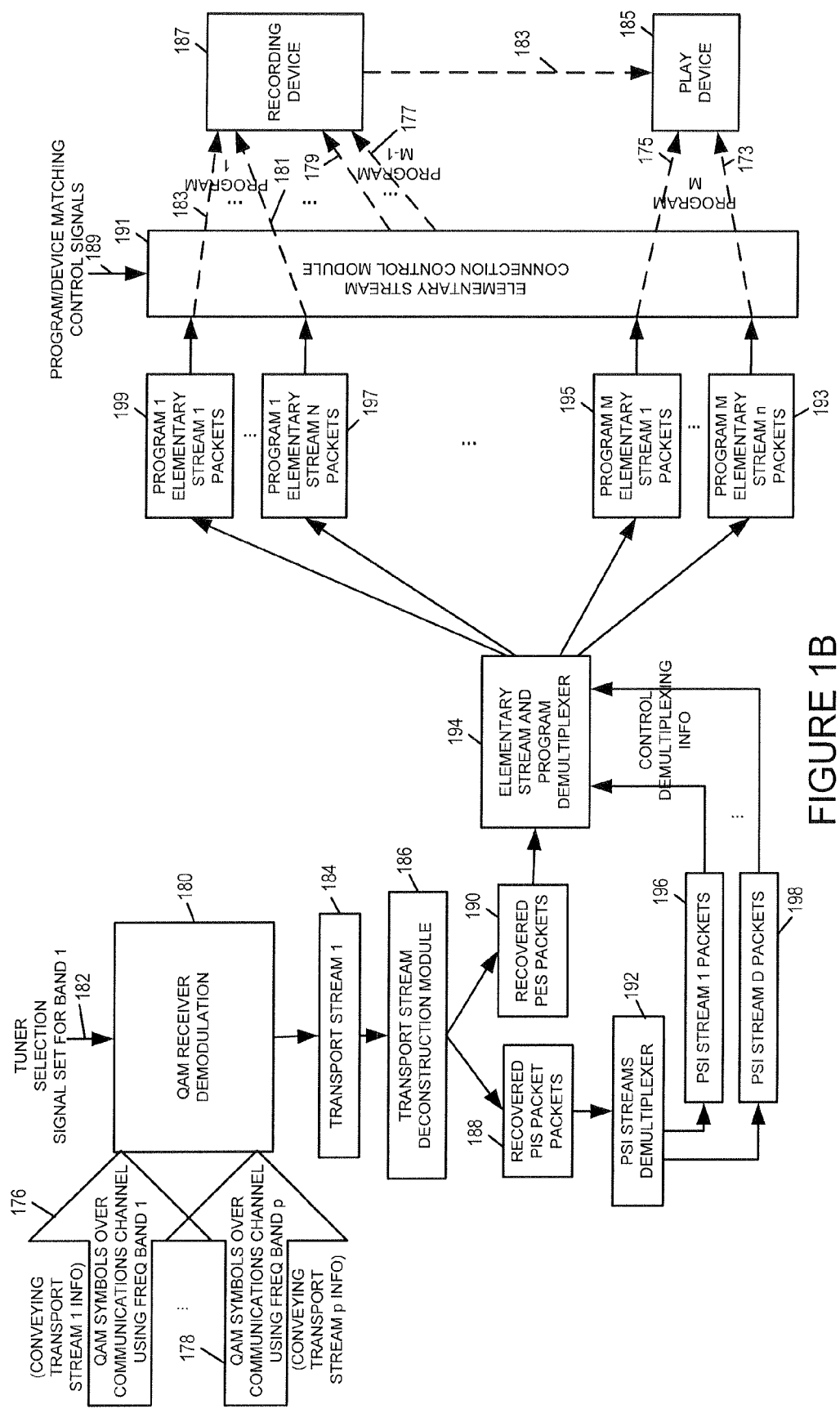

FIG. 1 comprising the combination of FIG. 1A and FIG. 1B is a drawing 100 illustrating exemplary communication, recording and playing of program information in accordance with various embodiments of the present invention. For each program to be communicated there are one or more elementary packet streams. Exemplary elementary streams corresponding to a program include, e.g., a low level video stream, an intermediate level video stream, a high level video stream and an audio stream. In FIG. 1, there are M exemplary programs to be communicated. Program 1 elementary packet streams information 102 includes a plurality of elementary packet streams (packetized elementary stream 1 108, . . . , packetized elementary stream N 110). Packetized elementary stream 1 108 includes a plurality of packetized elementary stream packets (PES packet 1 112, PES packet 2 114, PES packet 3 116 . . . ). Packetized elementary stream N 110 includes a plurality of packetized elementary stream packets (PES packet 1 118, PES packet 2 120, PES packet 3 122, . . . ). Program M elementary packet streams information 104 includes a plurality of elementary packet streams (packetized elementary stream 1 124, . . . , packetized elementary stream n 126). Packetized elementary stream 1 124 includes a plurality of packetized elementary stream packets (PES packet 1 128, PES packet 2 130, PES packet 3 132, . . . ). Packetized elementary stream n 126 includes a plurality of packetized elementary stream packets (PES packet 1 134, PES packet 2 136, PES packet 3 138, . . . ). PES packets can be, and sometimes are, of different size.

In addition to the elementary packets streams, there are also one or more transport stream program specific information streams including program mapping information to be communicated. Exemplary transport streams program specific information streams information 106 includes a TS program specific information stream 1 140, e.g., a program association table stream and TS program specific information stream D 142, e.g., a program mapping table stream. TS program specific information stream 1 140 includes a plurality of program information stream (PSI) packets (PSI packet 1 144, PSI packet 2 146, PSI packet 3 148, . . . ). TS program specific information stream D 142 includes a plurality of program information stream (PSI) packets (PSI packet 1 150, PSI packet 2 152, PSI packet 3 154, . . . ). PSI packets can be, and sometimes are, of different size.

Packets from the various program elementary streams (108, 110, 124, 126) and programs specific information streams (140, 142) are input to a transport stream packet generator module 156 which generates and outputs transport stream 1 158. Transport stream 1 158 includes a plurality of transport stream packets (TS packet 1 160, TS packet 2 162, . . . ). Each transport stream packet is of the same size. Each transport stream packet includes a packet identifier (PID) and a PES packet portion or a PSI packet portion. TS packet 1 160 includes PID 164 and PES or PSI packet portion 166. TS packet 2 162 includes PID 168 and PES or PSI packet portion 170.

Generated transport stream 1 158 is input to a QAM modulator 172. A tuner selection signal 174 for the QAM modulator is set for frequency band 1. The QAM modulator generates and outputs QAM symbols over a communications channel using frequency band 1, as represented by large arrow 176, the generated QAM symbols conveying the transport stream 1 158.

In FIG. 1B, QAM receiver demodulator 180, which is controllable, can receive information and process information corresponding to different transport streams, at different times. Large arrow 176, which is the output of FIG. 1A, represents QAM symbols over a communications channel using frequency band 1 conveying transport stream 1 information. Large arrow 178 represents QAM symbols over a communications channel using frequency band p conveying transport stream p information. QAM receiver demodulator 180 receives tuner selection signal 182, which at this time is set for band 1. QAM receiver demodulator receives and processes QAM symbols signals 176 and outputs transport stream 1 184. Transport stream 1 184 is input to transport stream deconstruction module 186 which recovers and outputs recovered PSI packets 188 and recovered PES packets 190. The recovered PSI packets are input to a PSI streams multiplexer 192 which recovers and outputs one or more PSI streams (PSI stream 1 packets 196, . . . , PSI stream D packets 198). Elementary stream and program demultiplexer module 194 receives recovered PES packets 190 and PSI stream 1 packets 196 and PSI stream D packets 198 as inputs. The packets of the PSI streams (196, . . . , 198) provide control demuxing information, which module 194 uses to map particular recovered packets PES packets back to a program elementary stream of a particular program. Elementary streams corresponding to the M programs are output from module 194. Corresponding to program 1, program 1 elementary stream 1 packets 199, . . . , program 1 elementary stream N packets 197 are recovered. Corresponding to program M, program M elementary stream 1 packets 195, . . . , program 1 elementary stream n packets 193 are recovered.

The various elementary streams ((199, . . . , 197), . . . , (195, . . . , 193)) are input to elementary stream connection control module 191. The elementary stream connection control module 191 can, and sometimes does, couple a set of elementary streams corresponding to a program to one or more of a recording device 187 and a play device 185. Program/device matching control signals 189, input to connection control module 191, are used by module 191 to control coupling selection. In this example, at this time, control signals 189 control programs 1 through program M-1 to be coupled to recording device 187, as indicated by arrows ((183, 181), (179, 177)) and program M to be coupled to play device 185, as indicated by arrows (175, 173). Thus, play device 185 can be playing program M at the same time that recording device 187 is recording program 1 through program M-1. Arrow 183 from recording device 187 to play device 185 indicates that a recorded program stored on recording device 187 may be accessed and played by play device 185.

At different times, different programs may be, and sometimes are, coupled to different devices. Sometimes, in some embodiments, some programs from the set of programs communicated in the transport stream which is recovered are coupled through module 191, which other programs from the set of programs communicated in the same transport stream are not coupled through module 191. In some embodiments, at some times, some of the elementary transport streams corresponding to a program are coupled and/or used by recording device 187 and/or play device 185, while other elementary streams corresponding to the same program are not coupled and/or used by the recording device and/or play device 185. In some such embodiments, control signals 189 also control selection of subsets of elementary streams. For example, a user's play device 185 may not have high definition capability; therefore, elementary streams used for high definition are not forwarded to recording device 187 and/or play device 185. As another example, high definition video is a premium service to which a particular user has not subscribed; and therefore elementary streams used for high definition are not forwarded to recording device 187 and/or play device 185.

In one exemplary embodiment, the transport stream packet generator 158 and QAM modulator 172 are part of a content distribution node. In some such embodiments, the tuner selection signal 174 is generated by a policy server node, e.g., a switched digital video (SDV) policy server node. In various embodiments, the QAM receiver demodulator 180, transport stream deconstruction module 186, PSI streams demultiplexer 192, elementary stream and program multiplexer 194 and elementary stream connection control module 191 are included as part of a set top box (STB). In various embodiments, the recording device 187 is a digital storage device, e.g., a DVR, at the customer premise corresponding to the STB, and the play device 185 is, e.g., a television set, at the customer premise corresponding to the STB.

FIG. 2 illustrates in drawing 200 a feature of various embodiments of the present invention, in which the selection of programs to be carried by a transport stream is a function of end user program selection. In the example of FIG. 2, there are NT available programs (program 1 data/information 202, program 2 data/information 204, program 3 data/information 206, program 4 data/information 208, program 5 data/information 210, program 6 data/information 212, program 7 data/information 214, program 8 data/information 216, program 9 data/information 218, program 10 data/information 220, program 11 data/information 222, program 12 data/information 224, . . . , program NT data/information 226. Each set of program data/information, e.g., program 2 data/information 204 includes one or more elementary packet streams, e.g., a low level video stream, an intermediate level video stream, a high level video stream, an audio stream, a first closed caption stream, a second closed caption stream, a foreign language audio stream, etc.

The program data/information (202, 204, 206, 208, 210, 212, 214, 216, 218, 220, 222, 224, . . . , 226) are available as inputs to program selection module 228. Selection control signals 230, which are a function of end user program request(s), are used by program selection module 228 to control population of a transport stream. At this particular time the selection control signal 230 indicates that programs (2, 6, 9, 11 and $N_T$) are to be carried by a single transport stream, and module 228 forwards the corresponding data/information as indicated by dashed line arrows (232, 234, 236, 238, 240). Large arrow 242 represents that a plurality of selected programs are being carried on a single transport stream, wherein at least some of the selected programs were selected in response to end user program requests. The transport stream packets corresponding to the plurality of selected programs are typically multiplexed in the transport stream.

FIG. 3 is a drawing 300 illustrating exemplary end user program selection, control signaling, transport stream construction, and content delivery in accordance with various embodiments of the present invention.

In drawing 300 there is a content delivery system including an SDV policy server 301, a content distribution node 303, and a plurality of set top boxes (STB A 305, STB B 307, STB C 309). STB A 305 sends signal 352 to SDV policy server 301 to request program channels 1, 2, 3, 4 & 5. The SDV policy server 301 receives the request signal 352 and generates control signal 354, which it sends to content distribution node 303. Control signal 354 commands that channels 1, 2, 3, 4, & 5 be placed in a transport stream communicated using QAM signals in frequency band X. Content distribution node 303 implements the command. SDV policy server 301 sends tuner control signal 356 to STB A 305 notifying STB A 305 to set its QAM receiver/demodulator 311 to select band X.

Next, STB B 307 sends signal 358 to SDV policy server 301 to request program channels 1, 2, 3. The SDV policy server 301 receives the request signal 358, recognizes that the requested changes are already available on frequency band X and generates tuner control signal 360, which it sends to STB B 307. Tuner control signal 360 notifies STB B 307 to set its QAM receiver/demodulator 313 to select band X.

Next, STB C 309 sends signal 362 to SDV policy server 301 to request program channel 6. The SDV policy server 301 receives the request signal 362 and generates control signal 364, which it sends to content distribution node 303. In this example, a transport stream corresponding to a frequency band can carry up to 5 multiplexed program channels; therefore, the transport stream for frequency band X is currently full. Control signal 364 commands that channel 6 be placed in a transport stream communicated using QAM signals in frequency band Y. Content distribution mode 303 implements the command. SDV policy server 301 sends tuner control signal 366 to STB C 309 notifying STB C 309 to set its QAM receiver/demodulator 315 to select band Y.

Next, STC 309 sends signal 368 to SDV policy server 301, requesting program channel 1. SDV policy server 301 sends control signal 370 to content distribution node 303 commanding node 303 to add program channel 1 to frequency band Y. Content distribution node 303 implements the request.

Drawing 300 also includes information 319 identifying the programs being carried by transport stream 1 using frequency band X over time, and information 321 identifying the programs being carried by transport stream 1 using frequency band X over time. Information 319 and 321 identifies conveyed information in signals 323 being output from content distribution node 303 and which is available at the inputs to STBs (305, 307, 309). Time line 317 corresponds to information 319 and 321. Initially neither frequency band is carrying any user requested program channels. Then user requested programs channels 1, 2, 3, 4, and 5 are placed in transport stream 1 and communicated using QAM signals in frequency band X. At a later point in time, program channel 6 is placed into transport stream 2 and communicated using QAM signals in frequency band Y. At a still later point in time program channel 1 is also placed into transport stream 2 and communicated using QAM signals in frequency band Y. The program setting for frequency band X has remained for the duration of the example.

Figure 4:
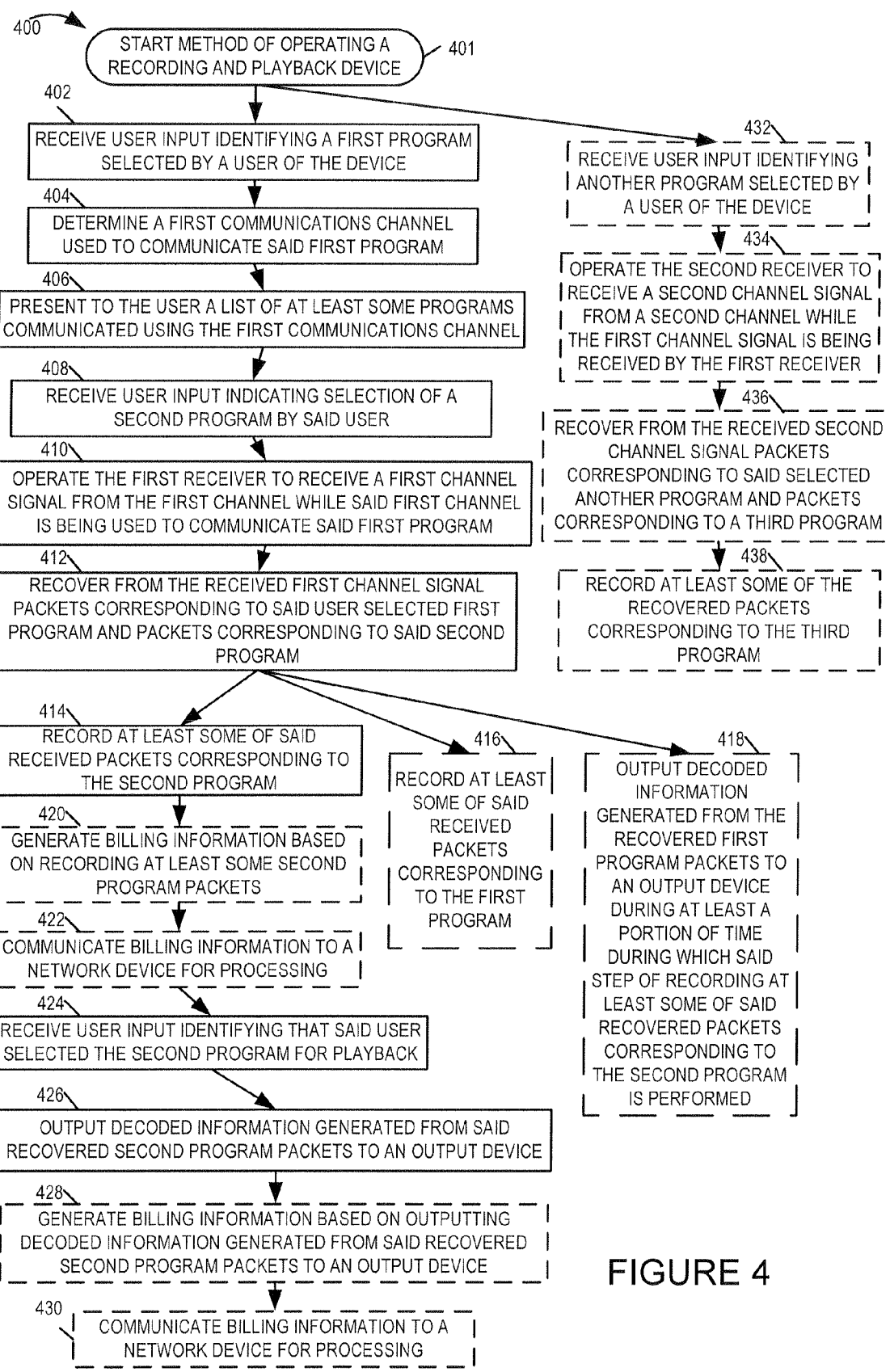
FIG. 4 is a drawing of a flowchart of an exemplary method of operating a recording and playback device.

FIG. 4 is a drawing of a flowchart 400 of an exemplary method of operating a recording and playback device. The exemplary recording and playback device includes, in some embodiments, a set top box including a digital recording device. The exemplary recording and playback device includes, in some embodiments, a set top box and a digital recording device coupled together.

Operation starts in step 401, where the recording and playback device is powered on and initialized and proceeds to step 402. In some embodiments, operation also proceeds from start step 401 to step 432.

In step 402, the device receives user input identifying a first program selected by a user of the device. Then, in step 404, the device determines a first communications channel used to communicate the first program. Operation proceeds from step 404 to step 406. In step 406, the device presents the user with a list of at least some programs communicated using the first communications channel. Then, in step 408, the device receives user input indicating selection of a second program by the user. Operation proceeds from step 408 to step 410. In step 410, the device operates a first receiver to receive a first channel signal from the first channel while the first channel is being used to communicate the first program. Operation proceeds from step 410 to step 412, in which the device recovers from the received first channel signal packets corresponding to said user selected first program and packets corresponding to said second program. Operation proceeds from step 412 to step 414 and to one or more of steps 416 and 418.

In step 414, the device records at least some of said received packets corresponding to the second program. In some embodiments, operation proceeds from step 414 to step 420, while in other embodiments, operation proceeds from step 414 to step 424. In step 420, the device generates billing information based on recording at least some of said packets, and then in step 422, the device communicates the billing information to a network device for processing. Operation proceeds from step 422 to step 424.

In step 424, the device receives user input identifying that said user selected the second program for playback, and then in step 426, the device outputs decoded information generated from the recovered second program packets to an output device, e.g., a television. In various embodiments, optional steps 428 and 430 are performed. In step 428, the device generates billing information based on outputting decoded information generated from the recovered second program packets to an output device, and in step 430 the device communicates the billing information to an network device for processing.

Returning to step 416, in step 416, the device records at least some of said received packets corresponding to the first program. Returning to step 418, in step 418, the device outputs decoded information generated from the recovered first program packets to an output device during at least a portion of time during which said step of recording at least some of said recovered packets corresponding to the second program is performed.

Optional steps 432, 434, 436 and 438 are performed in some embodiments in which the recoding and playback device includes a second receiver. Returning to step 432, in step 432, the device receives user input identifying another program selected by a user of the device. Then, in step 434, the device operates a second receiver to receive a second channel signal from a second channel while the first channel is being received by the first receiver. Operation proceeds from step 434 to step 436, in which the device recovers from the received second channel signal packets corresponding to said selected another program and packets corresponding to a third program. Then, in step 438, the device records at least some packets corresponding to the third program.

In some embodiments, the first communications channel is a QAM communications channel capable of communicating multiple programs. In some such embodiments, the first communications channel is a MPEG-2 transport stream. In some such embodiments, at least one of the multiple programs comprises a plurality of MPEG-2 elementary streams.

In various embodiments, the number of said multiple programs is at least five, and packets corresponding to more programs are recorded than QAM receivers included in said recording and playback device. For example, the recording and playback device may include only a single QAM receiver and yet the recording and playback device can record packets corresponding to two different programs being communicated in the same transport stream including multiplexed packets corresponding to the two programs. As another example, the recording and playback device may include two single QAM receivers and yet the recording and playback device can record packets corresponding to three different programs being communicated in the same transport stream including multiplexed packets corresponding to the three programs. Thus, various embodiments of the invention do not need an individual QAM receiver module for each program to be recovered, where programs to be recovered are being communicated in the same time interval, e.g., within the same transport stream using QAM in the same band.

Figure 5B:
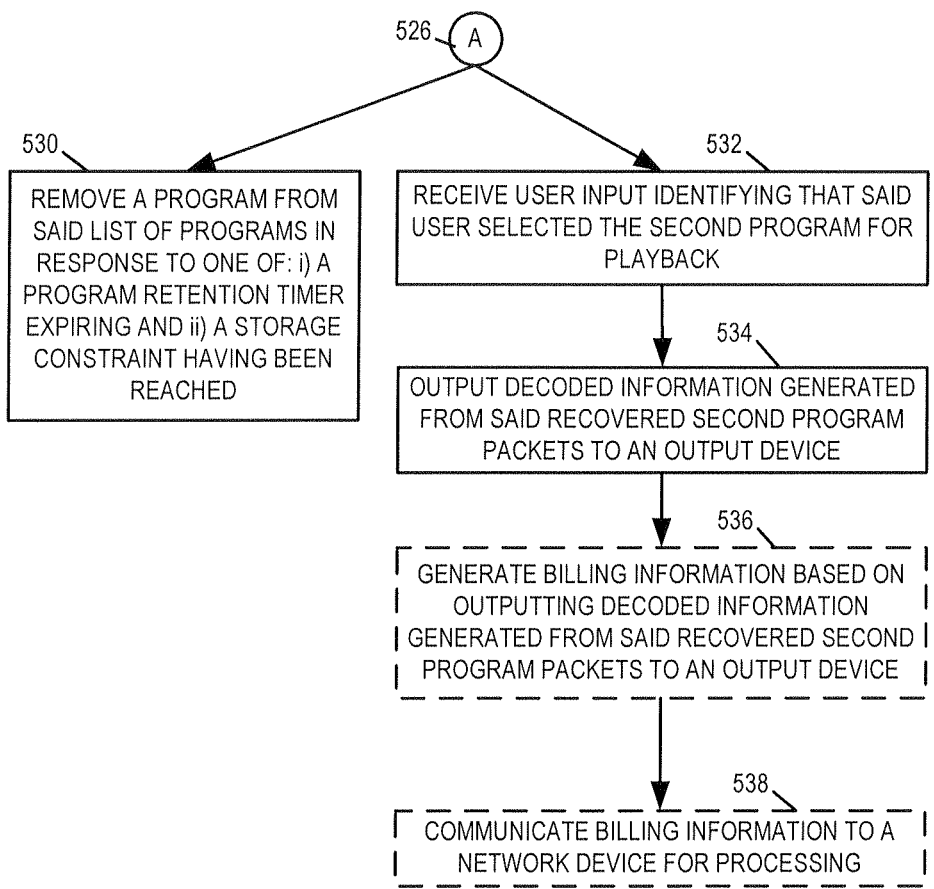
FIG. 5B is a drawing of a flowchart of an exemplary method of operating a recording and playback device.

FIG. 5 comprising the combination of FIG. 5A and FIG. 5B is a drawing of a flowchart 500 of an exemplary method of operating a recording and playback device. The exemplary recording and playback device includes, in some embodiments, a set top box including a digital recording device. The exemplary recording and playback device includes, in some embodiments, a set top box and a digital recording device coupled together.

Operation starts in step 502, where the recording and playback device is powered on and initialized and proceeds to step 504. In some embodiments, operation also proceeds from start step 502 to step 540.

In step 504, the device receives user input identifying a first program selected by a user of the device. Then, in step 506, the device determines a first communications channel used to communicate the first program. Operation proceeds from step 506 to step 508. In step 508, the device presents the user with a list of at least some programs communicated using the first communications channel. Then, in step 510, the device receives user input indicating selection of a second program by the user. Operation proceeds from step 510 to step 512. In step 512, the device operates a first receiver to receive a first channel signal from the first channel while the first channel is being used to communicate the first program. Operation proceeds from step 512 to step 514, in which the device recovers from the received first channel signal packets corresponding to said user selected first program and packets corresponding to said second program. Operation proceeds from step 514 to step 516 and, optionally to step 518.

In step 516, the device records at least some packets from each of a plurality of programs communicated on said first communications channel while said first communications channel is being used to communicate the first program. Step 516 includes sub-step 520. In some embodiments, step 516 includes sub-step 522. In sub-step 520 the device records at least some of said packets corresponding to the second program. In sub-step 522, the device records at least some of the received packets corresponding to the first program. Operation proceeds from step 516 to step 524. In step 524, the device present the user with a list of programs received over the first communications channel which are available for playback, at least a portion of at least one program on said list having been communicated to said device while said first communications device is used to communicate said first program. Operation proceeds from step 524 via connecting node A 526 to step 530 and step 532.

In step 530 the device removes a program from said list of programs in response to one of: i) a program retention timer expiring and ii) a storage constraint having been reached. In some embodiments, the program retention timer indicates an mount of time a recorded program is to be retained without having been selected by the user. In some embodiments, the storage constraint is a constraint on the amount of storage pace available for program storage.

In step 532, the device receives user input identifying that said user selected the second program for playback, and then in step 534, the device outputs decoded information generated from the recovered second program packets to an output device, e.g., a television. In various embodiments, optional steps 536 and 538 are performed. In step 536, the device generates billing information based on outputting decoded information generated from the recovered second program packets to an output device, and in step 538 the device communicates the billing information to a network device for processing.

Returning to step 518, in step 518, the device outputs decoded information generated from the recovered first program packets to an output device during at least a portion of time during which said step of recording at least some of said recovered packets corresponding to the second program is performed.

Optional steps 540, 542, 544 and 546 are performed in some embodiments in which the recoding and playback device includes a second receiver. Returning to step 540, in step 540, the device receives user input identifying another program selected by a user of the device. Then, in step 542, the device operates a second receiver to receive a second channel signal from a second channel while the first channel is being received by the first receiver. Operation proceeds from step 542 to step 544, in which the device recovers from the received second channel signal packets corresponding to said selected another program and packets corresponding to a third program. Then, in step 546, the device records at least some packets corresponding to the third program.

In some embodiments, the first communications channel is a QAM communications channel capable of communicating multiple programs. In some such embodiments, the first communications channel is a MPEG-2 transport stream. In some such embodiments, at least one of the multiple programs comprises a plurality of MPEG-2 elementary streams.

In various embodiments, the number of said multiple programs is at least five, and packets corresponding to more programs are recorded than QAM receivers included in said recording and playback device. For example, the recording and playback device may include only a single QAM receiver and yet the recording and playback device can record packets corresponding to two different programs being communicated in the same transport stream including multiplexed packets corresponding to the two programs. As another example, the recording and playback device may include two single QAM receivers and yet the recording and playback device can record packets corresponding to three different programs being communicated in the same transport stream including multiplexed packets corresponding to the three programs. Thus, various embodiments of the invention do not need an individual QAM receiver module for each program to be recovered, where programs to be recovered are being communicated in the same time interval, e.g., within the same transport stream using QAM in the same band.

Figure 6:
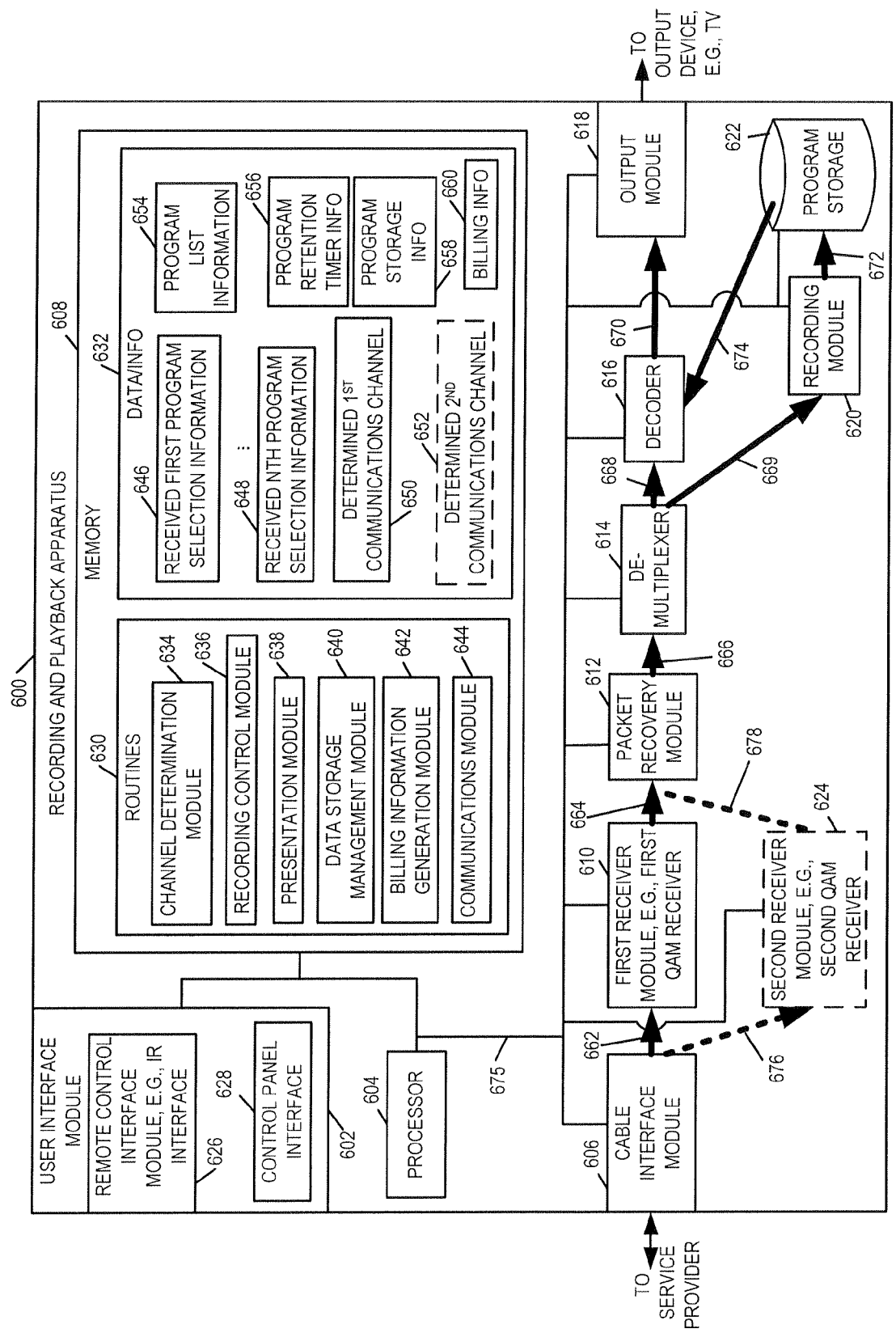
FIG. 6 is a drawing of an exemplary recording and playback apparatus implemented in accordance with various embodiments of the present invention.

FIG. 6 is a drawing of an exemplary recording and playback apparatus 600 implemented in accordance with various embodiments of the present invention. Exemplary recording and playback apparatus is, in some embodiments, a set top box. Exemplary recording and playback apparatus 600 includes a user interface module 602, a processor 604, a cable interface module 606, memory 608, a first receiver module 610, a packet recovery module 612, a de-multiplexer 614, a decoder 616, an output module 618, a recording module 620, and program storage 622 coupled together via bus 675 over which the various elements can interchange data and information. In some embodiments, the recording and playback apparatus 600 includes a second receiver module 624, which is also coupled to bus 675.

Memory 608 includes routines 630 and data/information 632. The processor 604, e.g., a CPU, executes the routines 630 and uses the data/information 632 in memory 608 to control the operation of the recording and playback apparatus 600 and implement methods in accordance with the present invention. Routines 630 includes a channel determination module 634, a recording control module 636, a presentation module 638, a data storage management module 640, a billing information generation module 642, and a communications module 644. Data/information 632 includes received first program selection information 646, . . . , received Nth program selection information 648, a determined $1^{st}$ communication channel information 650, program list information 654, program retention timer information 656, program storage information 658, and billing information 660. In some embodiments, e.g., an embodiment including second receiver module 624, data/information 632 includes determined $2^{nd}$ communications channel information 652.

User interface module 602 receives user input identifying a first program selected by a user of the recording and playback apparatus 600. User interface module 602 also receives user input identifying additional programs selected by the user of apparatus 600. For example, user interface module 602 receives, prior to recording at least some recovered packets corresponding to the second program, user input indicating selection of the second program by the user. User interface module 602 also receives information identifying whether the user would like to play a program being streamed, record a program being streamed, or play a program which was previously stored. User interface module 602 includes a remote control interface module 626, e.g., an infra-red (IR) interface, for interfacing with a user's remote control device, and a control panel interface 628, e.g., control switches, buttons, etc. hard mounted on the recording and playback device.

Channel determination module 634 determines a first communication channel used to communicate the first program. Determined $1^{st}$ communications channel information 650 is an output of channel determination module 634 and is used as an input to first receiver module 610. In some embodiments, the determined $1^{st}$ communications channel information identifies one of a plurality of alternative frequency bands, and is used by first receiver module 610 to tune its receiver.

Cable interface module 606 couples to recording and playback apparatus 600 to a service provider, e.g., a cable company. Cable interface module 600 couple the apparatus 600 to various service provider nodes, e.g., a content distribution node, a SDV policy server node, a billing node, etc.

Cable interface module 606 has an output which is coupled to an input of first receiver module 610 via link 662. In embodiments including a second receiver module 624, the cable interface module 606 has an output which is coupled to an input of second receiver module 624 via link 676.

First receiver module 610 is, e.g. a first QAM receiver. In various embodiments, the first communications channel is a QAM communications channel capable of communicating multiple programs. In some embodiments, the first communications channel communicates a MPEG-2 transport stream.

First receiver 610 receives a first channel signal from the first channel while said first channel is being used to communicate the first program. First receiver 610 also receives additional programs being communicated with the first program as part of the first communications channel signal.

An output of first receiver module 610 is coupled to an input of packet recovery module 612 via link 664. Packet recovery module 612 recovers from received first channel signal packets corresponding to said user selected first program and packets corresponding to a second program.

An output of packet recover module 612 is coupled to an input of de-multiplexer 612 via link 666. De-multiplexer 614 separates packets recovered by the packet recovery module 612 corresponding to different programs communicated over the first communications channel into different streams. In various embodiments the first communications channel communicates a MPEG-2 transport stream. In some such embodiments, at some times, at least one of the multiple programs being communications in the transport stream of the first communications channel includes a plurality of MPEG-2 elementary streams.

An output of de-multiplexer module 614 is coupled to an input of decoder module 616 via link 668. An output of de-multiplexer module 614 is coupled to an input of recording module 620 via link 669. An output of program storage 622 is coupled to an input of decoder module 616 via link 674.

Decoder module 616 decodes information generated from recovered packets corresponding to a program. The program can be, and sometimes is, a program which is currently being streamed or the program can be, and sometime is, a program which was previously recorded and stored in program storage 622. Decoder module 616 can, and sometimes does, decode information generated from the recovered first program packets.

An output of decoder module 616 is coupled to an input of output module 618 via link 670. Output module 618 outputs decoded information generated from recovered program packets corresponding to a program. During at least some times, output module 618 outputs decoded information generated from recovered first program packets to an output device during at least a portion of time during which recording module 620 records at least some recovered packets corresponding to a second program, wherein said first and second programs are being communicated in the first communications channel, e.g., the first transport stream using QAM signals in a first frequency band. Output module 618 is coupled to an output device, e.g., a television.

Recording module 620 includes an output coupled to program storage 622 via link 672. Programs are recorded in program storage 622 via recording module 620. In some embodiments, the user selects which programs are to be recorded, e.g., with the apparatus 600 supporting the recording of multiple programs from the same communications channel, e.g., multiple programs in which packets have been multiplexed into a stream. In some embodiments, the recording module 620 records, during at least some times, each of the programs being communicated in the first communications channel. In some such embodiments, the there are at least five programs being communicated in the first communications channel.

In some embodiments, the recording module 620 selectively records which one or more elementary streams corresponding to a program being recorded to record and which to discard. In some such embodiments the selection of elementary streams is a function of user input, e.g., a user choice to record in high resolution, a user choice to record audio in a particular language, etc. In some embodiments, the selection of elementary streams is performed based on known device capabilities of the user, e.g., the user does not have a high definition television and high definition video information would be of no use and is thus not recorded.

Recording control module 636 controls the operation of the recording module 620. For example, the recording control module 636 controls the recording module 620 to record at least some of the recovered packets corresponding to the second program. The recording module 636 can, and sometimes does, control the recording module 620 to record at least some recovered packets corresponding to the second program.

In various embodiments, the recording control module 636 controls, during at least some times, recording of at least some of the recorded packets corresponding to the second program as part of recording at least some packets from each of a plurality of programs communicated on the first communications channel while the first communications channel is used to communicate the first program.

Presentation module 638 presents the user with a list of at least some programs communicated using the first communications channel prior to receiving user input indicating selection of the second program. Presentation module 638 also, in some embodiments, presents the user with user with a list of programs received over the first communications channel which are available for playback, at least a portion of at least one program on the list having been communicated to said apparatus during a period of time during which the first channel was used to communicate the first program. Program list information 654 includes various lists generated by the presentation module 638.

Data storage management module 640 manages program storage 622. Data storage management module 640 operations include removing a program from a list of stored programs available for playback in response to one of i) a program retention timer expiring ii) a storage constraint having been reached; and iii) user input. Program retention timer information 656 includes ongoing retention timers corresponding to currently stored programs in program storage 622, which are used by data storage management module 640. Program storage information 658 includes information identifying an amount of free storage space in program storage 622, information identifying an amount of utilized storage in program storage 622, information identifying amounts of storage requirements associated with particular programs. Thus, while a retention timer can be used control program deletion, a program can also be removed from the list of stored programs by the subscriber's intervention, e.g., by the subscriber initiating deletion of the program.

Billing information generation module 642 generates billing information based on at least one of recording a program, e.g., recording at least some second program packets, and outputting decoded information generated from recovered program packets, e.g., outputting decoded information generated from said recovered second program packet to an output device. For example, in one embodiment, a user selects which programs to stream live and which to record and the user is billed for each selected program whether streamed live or recorded. In another embodiment, the recording module 620 records each of the programs in a communications channel and charges the user in response to the user selecting to output a particular program. For example, the first communications channel may convey five programs, each program conveying a concurrent sporting event, e.g., football game, and all of the programs are recorded and placed in program storage 622 and available to the user on an individual pay per view basis. Billing information 660 is an output of billing information generation module 660.

Communications module 644 communicates billing information to a network device for processing. For example, the communications module 644 controls that the billing information is routed through cable interface module 606 and directed to the service providers accounting node.

Second receiver 624, e.g., a second QAM receiver, included in some embodiments, has an input coupled to the output of cable interface module 606 and an output coupled to the input of packet recovery module 612. Channel determination module 634 determines a second communications channel 652 to be used to tune the second receiver. Thus in some embodiments, the first receiver can be tuned to receive a first transport stream using a first frequency band, and the second receiver can be tuned to concurrently receive a second transport stream using a second frequency band, said first and second frequency bands being different.

In various embodiments, the apparatus includes at least first and second QAM receiver modules, and the first communications channel each include at least five programs, and the number of programs in the first communications channel which can be recorded exceeds the number of QAM receiver modules in the apparatus.

In some other embodiments, an additional one or more of: packet recovery module 612, de-multiplexer 614, decoder 616, recording module 620, program storage 622 and/or output module 618 are included and used for signals received by second receiver module.

In some other embodiments, the recording and playback apparatus is distributed among a plurality of devices including a set top box and a digital video recorder coupled together.

Figure 7:
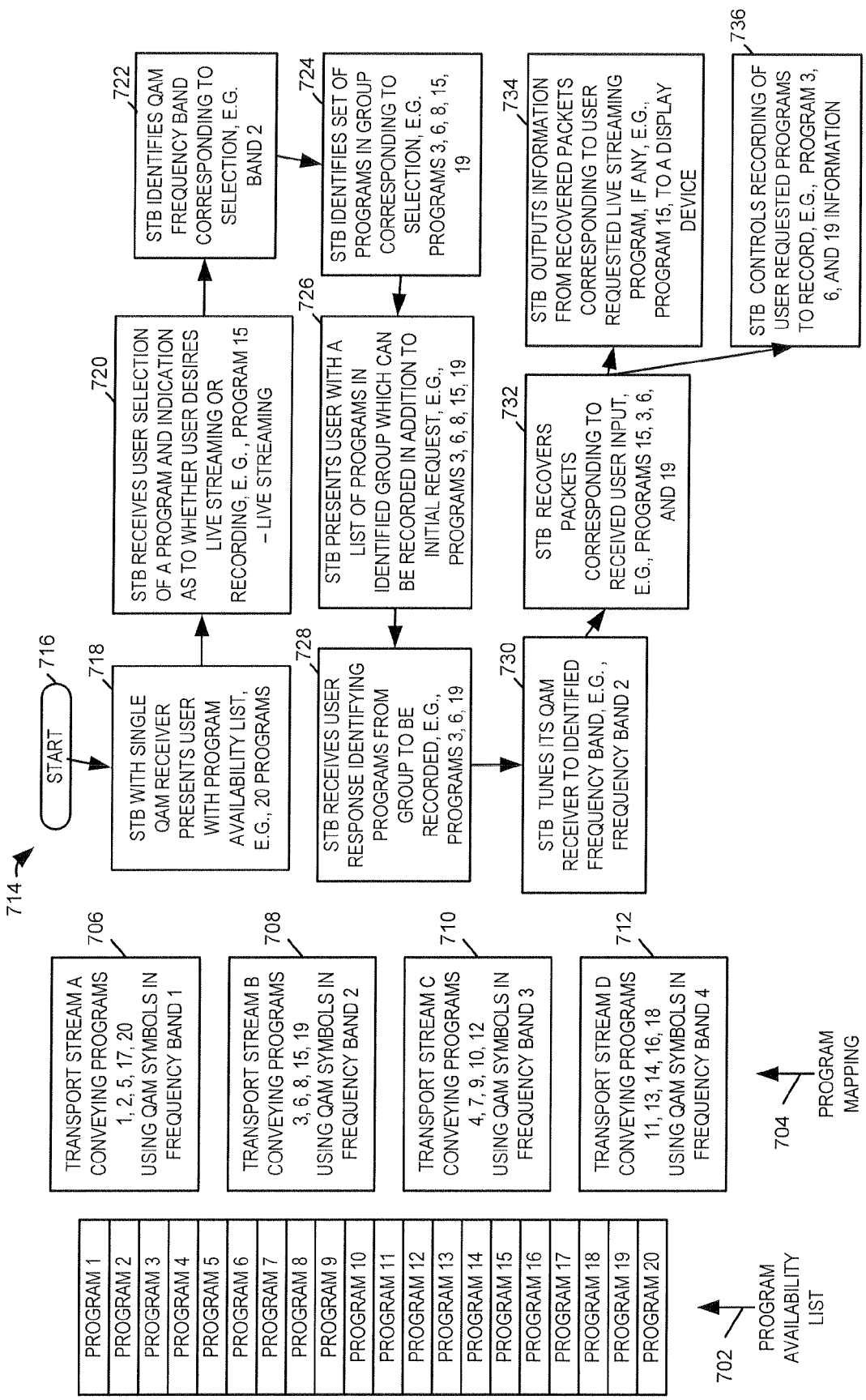
FIG. 7 is a drawing including an exemplary program listing, exemplary program mapping information and an exemplary flowchart in accordance with various embodiments of the present the invention.

FIG. 7 is a drawing including an exemplary program listing 702, exemplary program mapping information 704 and an exemplary flowchart 714 in accordance with various embodiments of the present invention. Consider that a cable service provider has a number of programs or program channels that are available concurrently. Program availability list 702 identifying 20 programs is an exemplary list of available concurrent programs being broadcast. The service provider is broadcasting the programs to be available at a customer's set top box. As part of the broadcasting implementation, the service provider associates groups of programs with different transport streams, e.g., MPEG-2 transport streams, and multiplexes packets of program information from an associated group of programs into the transport stream. In addition as part of the broadcasting implementation, each transport stream conveying a group of programs is communicated using QAM symbols in a different frequency band.

Program mapping information 704 identifies the exemplary association between programs, transport streams, and QAM frequency bands. In this example, each transport stream is conveying 5 programs. In other embodiments, a transport stream may convey a different number of programs. In some embodiments, different transports streams convey different numbers of programs. Block 706 identifies that transport stream A conveys programs 1, 2, 5, 17, and 20 using QAM symbols in frequency band 1. Block 708 identifies that transport stream B conveys programs 3, 6, 8, 15, and 19 using QAM symbols in frequency band 2. Block 710 identifies that transport stream C conveys programs 4, 7, 9, 10, and 12 using QAM symbols in frequency band 3. Block 712 identifies that transport stream D conveys programs 11, 13, 14, 16, and 18 using QAM symbols in frequency band 4.

Flowchart 714 is a flowchart of an exemplary method of operating a set top box with a single QAM receiver in accordance with various embodiments. Operation starts in step 716, where the STB is powered on and initialized, and proceeds to step 718. In step 718, the set top box presents the user with a program availability list, e.g., list 702 including 20 programs. Operation proceeds from step 718 to step 720. In step 720, the set top box receives user selection of a program and an indication as to whether the user desires live streaming or recording. For example, the received user input may indicate that program 15 has been selected and that the user desires live streaming. Operation proceeds from step 720 to step 722. In step 722, the STB identifies the frequency band corresponding to the user selection, e.g., frequency band 2.

The STB, in some embodiments, includes stored program mapping information, e.g., program mapping information 704, so that the STB can perform step 722. In some other embodiments, the STB communicate with a service provider node to obtain the mapping information which it needs. Operation proceeds from step 722 to step 724.

In step 724, the STB identifies the set of programs in the group corresponding to the user selection. For example, corresponding to user selection 15, the STB identifies programs 3, 6, 8, 15 and 19. The STB presents the user with a list of programs in the identified group which can be recorded in addition to the initial request. For example, corresponding to the request of live streaming program 15, the STB presents the user with a list of programs 3, 6, 8, 15, 19 which can be recorded. As an alternative example, corresponding to a request in step 720 of recording program 15, the STB present the user with a list of programs 3, 6, 8, 19 which can be recorded in addition to program 15. Operation proceeds from step 726 to step 728. In step 728, the STB receives a user response identifying programs from the presented list of step 726 to be recorded. For example, exemplary identified programs in the response are programs 3, 6, and 19. Operation proceeds from step 728 to step 730.

In step 730, the STB tunes its QAM receiver to the identified frequency band of step 722, e.g. frequency band 2. Then, in step 732, the STB recovers packets corresponding to received user input, e.g., packets corresponding to programs 15, 3, 6 and 19. Operation proceeds from step 732 to step 734 and step 736. In step 734, the STB outputs information from recovered packets corresponding to user requested live streaming, if any, to a display device, e.g., a television. For example, the outputted information may be decoded information corresponding to program 15. In step 736, the STB controls recording of user requested programs to record. For example, the STB controls recording of program 3, 6 and 19 information. In some embodiments, the recording device and/or recording medium is included as part of the set top box. In some embodiments, the recording device and/or recording medium are external to the STB.

In a variation of the present invention, the STB includes multiple QAM receivers; however, the STB is able to control recording of a greater number of concurrently broadcast programs than there are QAM receivers.

Figure 8:
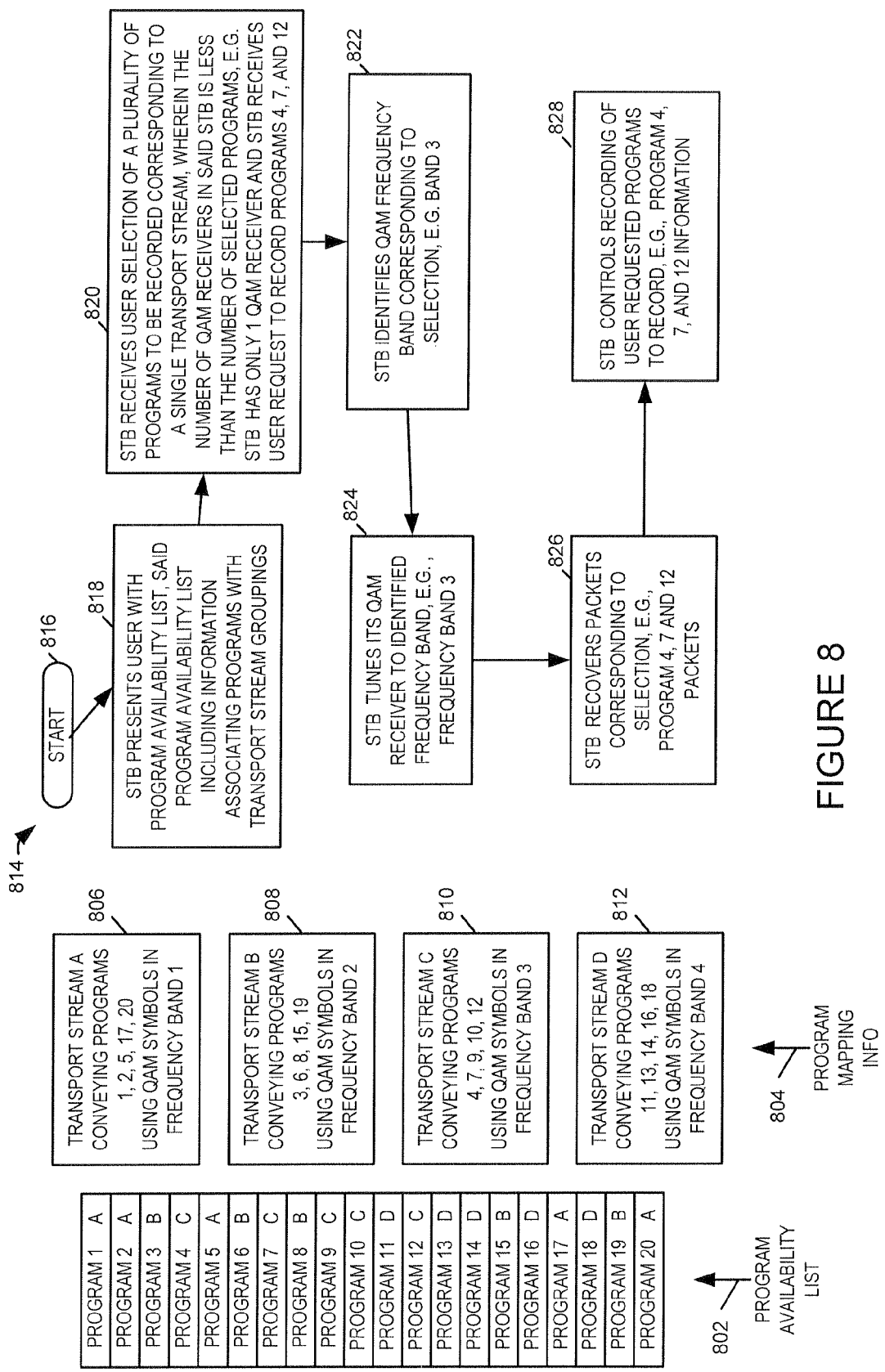
FIG. 8 is a drawing including an exemplary program listing, exemplary program mapping information and an exemplary flowchart in accordance with various embodiments of the present the invention.

FIG. 8 is a drawing including an exemplary program listing 802, exemplary program mapping information 804 and an exemplary flowchart 814 in accordance with various embodiments of the present the invention. Consider that a cable service provider has a number of programs or program channels that are available concurrently. Program availability list 802 identifying 20 programs is an exemplary list of available concurrent programs being broadcast. The service provider is broadcasting the programs to be available at a customer's set top box. As part of the broadcasting implementation, the service provider associates groups of programs with different transport streams, e.g., MPEG-2 transport streams, and multiplexes packets of program information from an associated group of programs into the transport stream. In addition as part of the broadcasting implementation, each transport stream conveying a group of programs is communicated using QAM symbols in a different frequency band.

Program mapping information 804 identifies the exemplary association between programs, transport streams, and QAM frequency bands. In this example, each transport stream conveying 5 programs. In other embodiments, a transport stream may convey a different number of programs. In some embodiments, different transports streams convey different numbers of programs. Block 806 identifies that transport stream A conveys programs 1, 2,5, 17, and 20 using QAM symbols in frequency band 1. Block 808 identifies that transport stream B conveys programs 3, 6, 8, 15, and 19 using QAM symbols in frequency band 2. Block 810 identifies that transport stream C conveys programs 4, 7, 9, 10, and 12 using QAM symbols in frequency band 3. Block 812 identifies that transport stream D conveys programs 11, 13, 14, 16, and 18 using QAM symbols in frequency band 4.

Corresponding to each of the programs, the list 802 also includes information associating the program with a transport stream into which the program is mapped and QAM frequency band into which the transport stream is communicated. In this example, a letter is used to indicate the mapping. In other embodiments, color coding or different symbols are used to indicate mapping.

Flowchart 814 is a flowchart of an exemplary method of operating a set top box with a single QAM receiver in accordance with various embodiments. Operation starts in step 816, where the STB is powered on and initialized, and proceeds to step 818. In step 818, the set top box presents the user with a program availability list, said program availability list including information associating programs with transport stream groupings, e.g., list 802 including 20 programs with group association information. Operation proceeds from step 818 to step 820. In step 820, the set top box receives user selection of a plurality of programs to be recorded corresponding to a single transport stream, wherein the number of QAM receivers in the STB is less than the number of selected programs. For example, the STB has only one QAM receiver and the STB receives a user request to record programs 4, 7, and 12. Operation proceeds from step 820 to step 822.

In step 822, the STB identifies the QAM frequency band corresponding to the selection, e.g., frequency band 3. Then, in step 824, the STB tunes its QAM receiver to the identified frequency band, e.g., frequency band 3. Operation proceeds from step 824 to step 826.

In step 826, the STB recovers packets corresponding to the selection, e.g., program 4 packets, program 7 packets and program 12 packets, and in step 828, the STB controls the recording of user requested program to record, e.g., program 4, 7, and 12 information. In some embodiments, the recording device and/or recording medium is included as part of the set top box. In some embodiments, the recording device and/or recording medium are external to the STB.

Figure 9A:
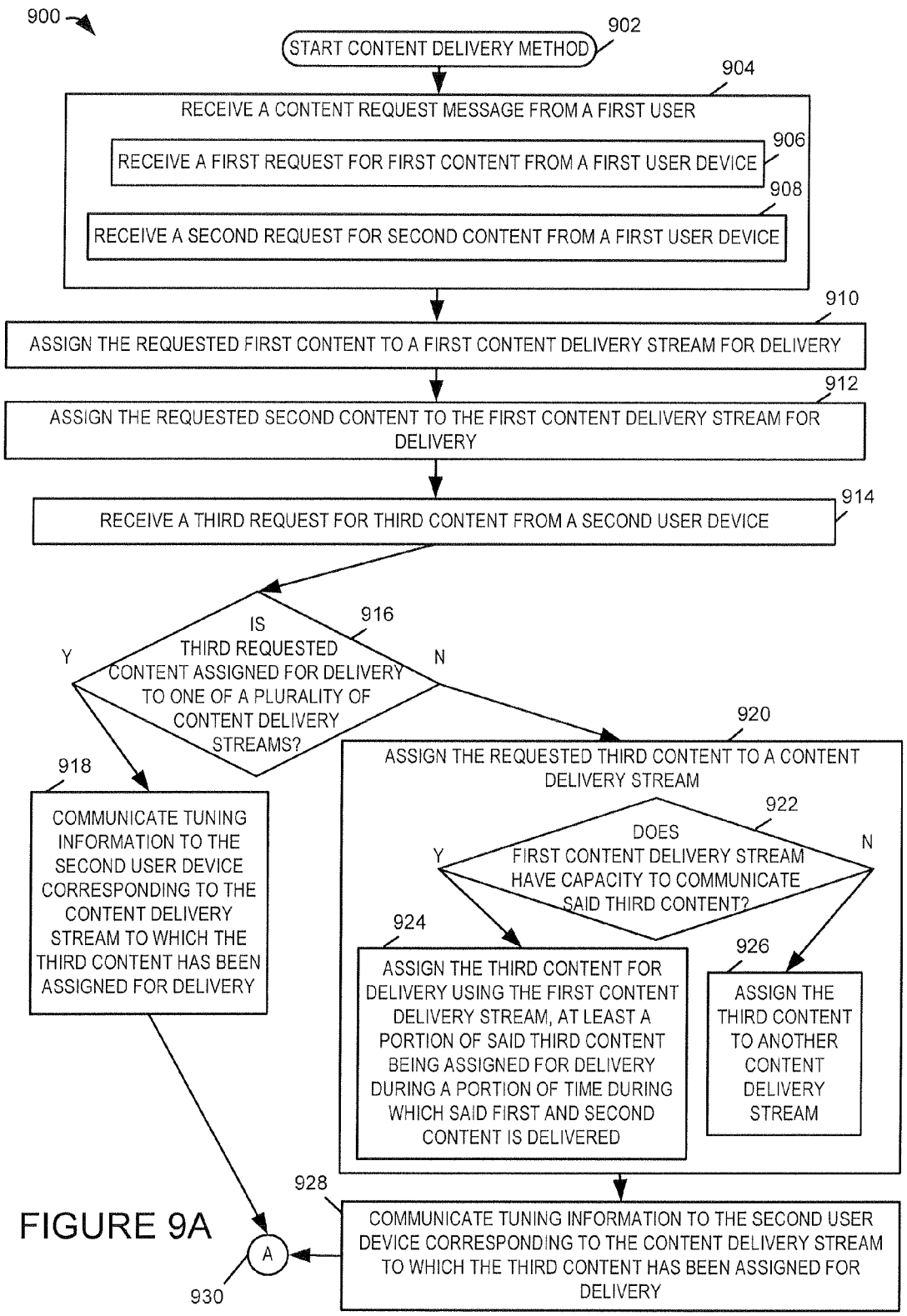
FIG. 9 comprising the combination of FIG. 9A
FIG. 9B is a drawing of a flowchart of an exemplary content delivery method in accordance with various embodiments of the present invention.

FIG. 9 is a drawing of a flowchart 900 of an exemplary content delivery method in accordance with various embodiments of the present invention. An exemplary content delivery control node, e.g., an SDV server, in some embodiments, performs the steps of flowchart 900. In some embodiments, a plurality of content delivery system nodes operating in combination performs the steps of flowchart 900. Operation starts in step 902 where the one or more nodes are powered on and initialized and proceeds to step 904. In step 904, a content request message from a first user is received. Step 904 includes sub-steps 906 and 908. In sub-step 906, a first request for first content from a first user device is received. In sub-step 908, a second request for second content from a first user device is received. In various embodiments, the first and second requests for content may be, and sometimes are, included in a single content request message received from the first user. Operation proceeds from step 904 to step 910.

In step 910, the requested first content is assigned to a first content delivery stream for delivery, and in step 912, the requested second content is assigned to the first content delivery stream for delivery. Operation proceeds from step 912 to step 914. In step 914, a third request for third content is received from a second user device. Operation proceeds from step 914 to step 916.

In step 916, a check is performed as to whether or not the third request content is assigned for delivery to one of a plurality of content delivery streams. If the third requested content is already assigned for delivery to a content delivery stream, then operation proceeds from step 916 to step 918, where tuning information is communicated to the second user device corresponding to the content delivery stream to which the third content has been assigned for delivery.

If the third requested content is not assigned to a content delivery stream, then operation proceeds from step 916 to step 920, where the requested third content is assigned to a content delivery stream. Step 920 includes sub-steps 922, 924 and 926. In sub-step 922, it is determined whether or not the first content delivery stream has enough capacity to communicate the third content stream. If it is determined, that the first content delivery stream has enough capacity, then, operation proceeds from sub-step 922 to sub-step 924; otherwise operation proceeds from sub-step 922 to sub-step 926. In sub-step 924, the third content is assigned for delivery to first content stream, at least a portion of said third content being assigned for delivery being during a portion of time during which said first and second content is delivered. In sub-step 926, the third content is assigned to another content delivery stream. Operation proceeds from step 920 to step 928. In step 928, tuning information is communicated to the second user device corresponding to the content delivery stream to which the third content has been assigned for delivery. Operation proceeds from step 918 or step 928 to step 932 via connecting node A 930.

In step 932, a fourth request for first content is received from the second user device. Operation proceeds from step 932 to step 934. In step 934, a check is performed as to whether or not the requested first content is assigned for delivery in the content delivery stream to which the second user device is currently tuned to. If the requested first content is not in the content delivery stream to which the second user device is currently tuned, then operation proceeds from step 934 to step 935. In step 935, a check is performed to determined whether or not the content delivery stream to which the second user device is currently tuned has enough capacity to communicate the first content. If it is determined that the content delivery stream to which the second user device is tuned has enough capacity then operation proceeds from step 935 to step 936; otherwise, operation proceeds from step 935 to step 938.

In step 936, the requested first content is assigned to the content delivery stream to which the second user device is currently tuned. In step 938, the first and third content is assigned for delivery to a third content delivery stream. Operation proceeds from step 938 to step 940. In step 940, tuning information is communicated to the second user device corresponding to the third content delivery stream to which the requested first and third content has been assigned for delivery.

In various embodiments, the first and second content include video content and the first content delivery stream is a first transport stream. In some such embodiments, the transport stream is a MPEG-2 transport stream, and the method further comprises communicating the transport stream to the first user device using a first QAM channel. In various embodiments, the first, second, and third content delivery streams are first, second and third transport streams, e.g., first, second, and third MPEG-2 transport streams using first, second and third QAM channels. In some embodiments, the first user device is a first set top box, and the second user device is a second set top box.

Figure 10:
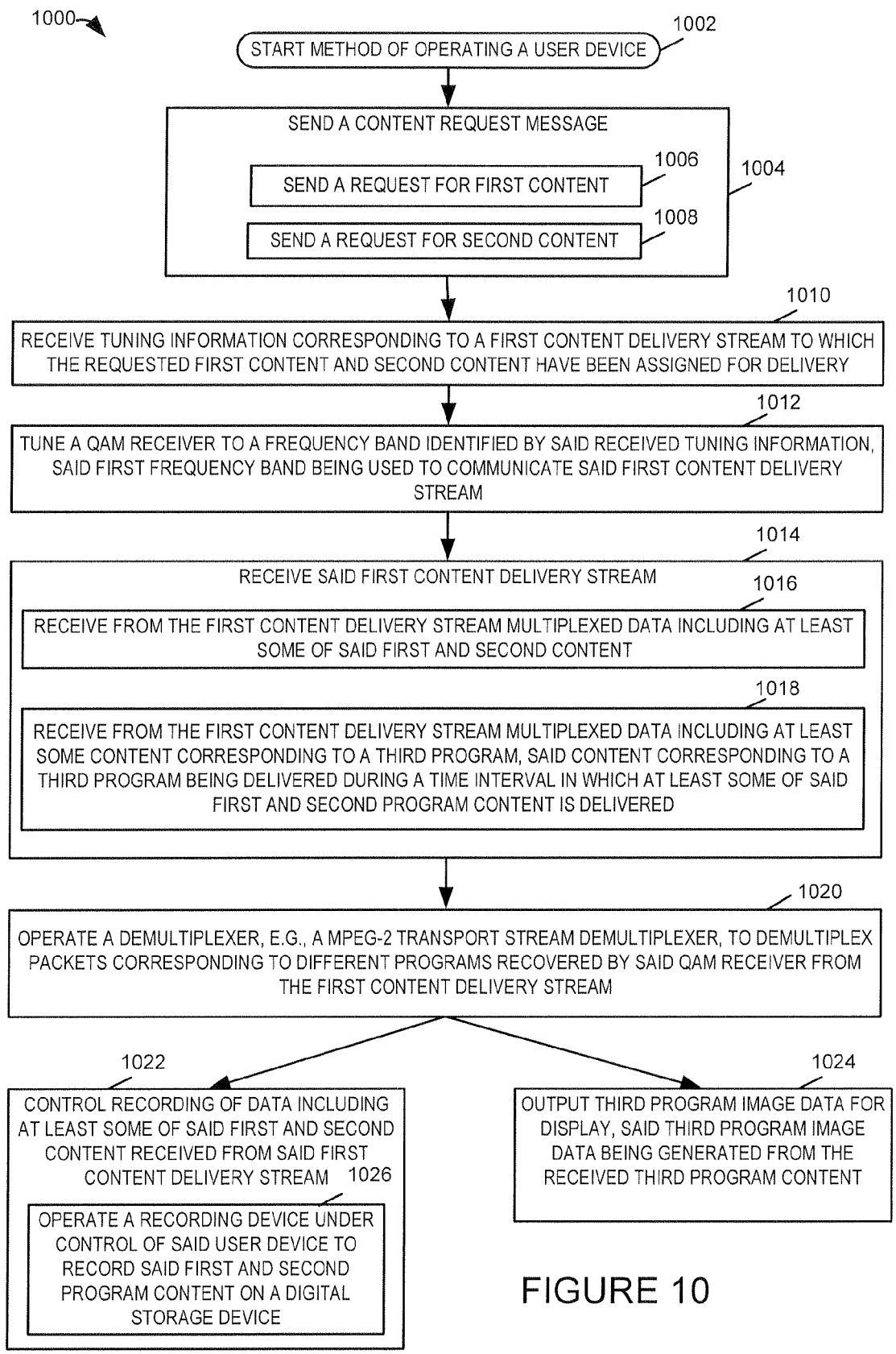
FIG. 10 is a drawing of a flowchart of an exemplary method of operating a user device, e.g., a set top box, in accordance with various embodiments of the present invention.

FIG. 10 is a drawing of a flowchart 1000 of an exemplary method of operating a user device, e.g., a set top box, in accordance with various embodiments of the present invention. In some embodiments, the user device includes a set top box coupled to a digital recording device. Operation starts in step 1002, where the user device is powered on and initialized. Operation proceeds from start step 1002 to step 1004. In step 1004 the user device sends a content request message, e.g., to a service provider control node. Step 1004 includes sub-steps 1006 and 1008. In sub-step 1006, the user device sends a request for first content, and in sub-step 1008, the user device sends a request for second content. In some embodiments, first content corresponds to a first program and second content corresponds to a second program. Operation proceeds from step 1004 to step 1010.

In step 1010, the user device receives tuning information corresponding to a first content delivery stream to which the requested first content and the requested second content have been assigned for delivery. Operation proceeds from step 1010 to step 1012. In step 1012, the user device tunes a QAM receiver to a frequency band identified by the received tuning information, said first frequency band being used to communicate said first content delivery stream. In some embodiments, the frequency band is identified by a stream channel indicator. Operation proceeds from step 1012 to step 1014.

In step 1014, the user device receives said first content delivery stream, e.g., from a service provider content distribution node. Step 1014 includes sub-steps 1016 and 1018. In sub-step 1016, the user device receives from first content delivery stream multiplexed data including at least some of the first and second content. In sub-step 1018, the user device receives from the first content delivery stream multiplexed data including at least some content corresponding to a third program, said content corresponding to the third program being delivered during a time interval in which at least some of said first and second program content is delivered. Operation proceeds from step 1014 to step 1020.

In step 1020, the user device operates a demultiplexer, e.g., a MPEG-2 transport stream demultiplexer to demultiplex packets corresponding to different programs recovered by said QAM receiver from the first content delivery stream. Operation proceeds from step 1020 to step 1022 and step 1024.

In step 1022, the user device controls recording of data including at least some of said first and second content received from said first content delivery stream. Step 1022 includes sub-step 1026. In sub-step 1026, the user device operates a recording device under control of said user device to record said first and second program content on a digital storage device. In some embodiments the recording device is included within said user device. In some such embodiments, the user device includes a sealed housing and the storage device is located within the sealed housing.

In step 1024, the user device outputs third program image data for display, said third program image data being generated from the received third program content. In some embodiments, during some times, outputting third program image data for display is performed while controlling recording of said first and second content.

Figure 11:
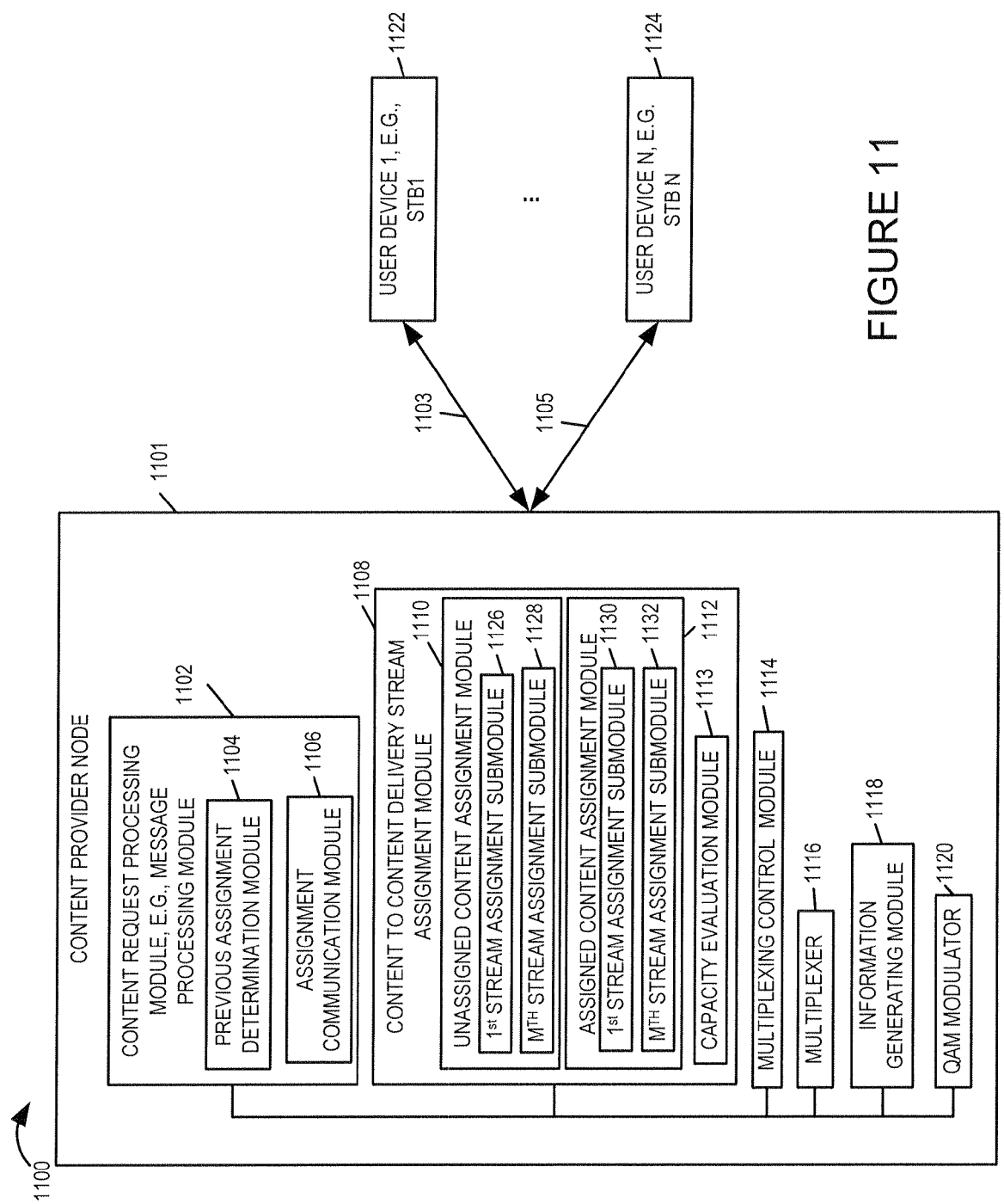
FIG. 11 is a drawing of an exemplary content delivery system implemented in accordance with the present invention.

FIG. 11 is a drawing of an exemplary content delivery system 1100 implemented in accordance with the present invention. Exemplary content delivery system includes a content provider node 1101 and a plurality of user device (user device 1 1122, . . . , user device N 1124) coupled together via links (1103, 1105), respectively. User devices (1122, . . . , 1124), are, e.g., set top boxes. Exemplary content provider node 1101 includes a content request processing module 1102, a content to content delivery stream assignment module 1108, a multiplexing control module 1114, a multiplexer 1116, an information generating module 118 and a QAM modulator 1 120. In some embodiments, various modules in exemplary content provider node 1101 are distributed among a plurality of content provider nodes, e.g., a plurality of content provider nodes including a control node and a content distribution node.

Content request processing module 1102 is, e.g., a message processing module. Content request processing module 1102 receives and processes multiple content requests from user devices, e.g., from user device 1 1122. Multiple content requests include a first request for first content and a second request for second content from the same user, e.g., user device 1 1122. In some embodiments, the first and second request for content are included in a single content request message communicated from a user, e.g., from the user of user device 1 1122.

Content request processing module 1102 is configured to receive and process additional requests from other users, e.g., requests from user device N 1 124. Content request processing module 1102 includes a previous assignment determination module 1104 and an assignment communication module 1106. Previous assignment determination module 1104 determines if content requested by an additional user device has already been assigned for delivery to one of the plurality of content delivery streams. Assignment communication module 1106 communications tuning information to the additional user device, said tuning information corresponding to the content delivery stream to which the requested additional content has been assigned for delivery.

Content to content delivery stream assignment module 1108 assigns requested content to individual ones of a plurality of available content delivery streams, at least some of said content delivery streams having sufficient bandwidth to support the delivery of multiple programs, said content to content delivery stream assignment module 1108 assigning content corresponding to multiple different content requests from a user, e.g., a first user, to at least one content delivery stream according to a predetermined content to content delivery stream assignment mapping process.

Content to content delivery stream assignment module 1108 includes an unassigned content assignment module 1110, an assigned content assignment module 1112, and a capacity evaluation module 1113. Unassigned content assignment module 1110 assigns additional requested content to a content delivery stream when said additional request content has not already been assigned to be delivered by the content delivery stream. Assigned content assignment module 1112 assigns additional request content to an additional content delivery stream when said additional request content has already been assigned to be delivered by the content delivery stream. Capacity evaluation module 1114 determines whether a content delivery stream, e.g., content delivery stream 1, has the capacity to communicate additional content.

Unassigned content assignment module 1110 includes a $1^{st}$ stream assignment submodule 1126 and an Mth stream assignment submodule 1128. One of the submodules (1126, . . . , 1128) is selected to be used, corresponding to additional requested content which has not been assigned, as function of a capacity evaluation determination or determinations. Similarly, assigned content assignment module 1112 includes a $1^{st}$ stream assignment submodule 1130 and an Mth stream assignment submodule 1132. One of the submodules (1130, ..., 1132) is selected to be used, corresponding to additional requested content which has already been assigned to at least one stream, as function of a capacity evaluation determination or determinations.

Multiplexing control module 1114 controls multiplexing of content assigned to the same content delivery stream. In various embodiments, the first and second content includes video content. Multiplexer 1116 generates an MPEG-2 transport stream from a first MPEG-2 elementary stream including at least some of said first content and a second elementary stream including at least some of said second content. Information generating module 1118 generates multiplexing information to be included in an MPEG-2 transport stream, said information generating module 1118 generating information used to identify first packets included in said MPEG-2 transport stream which correspond to said first content and to identify second packets included in said MPEG-2 transport stream corresponding to second content. QAM modulator 1120 modulates content of a content delivery stream onto a QAM communications channel.

Figures 12, 12A:
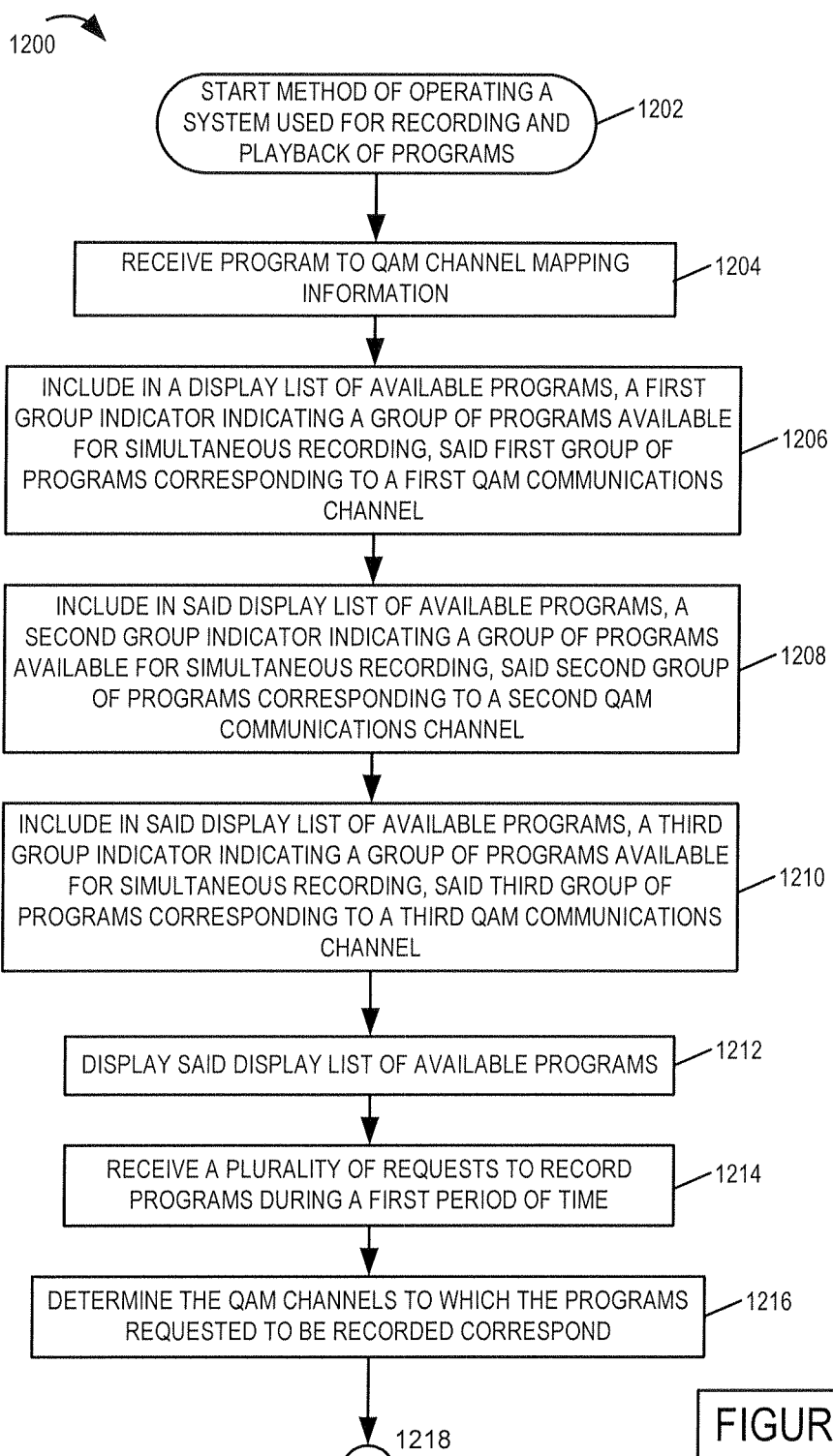
FIG. 12 comprising the combination of FIG. 12A
Figure 12B:
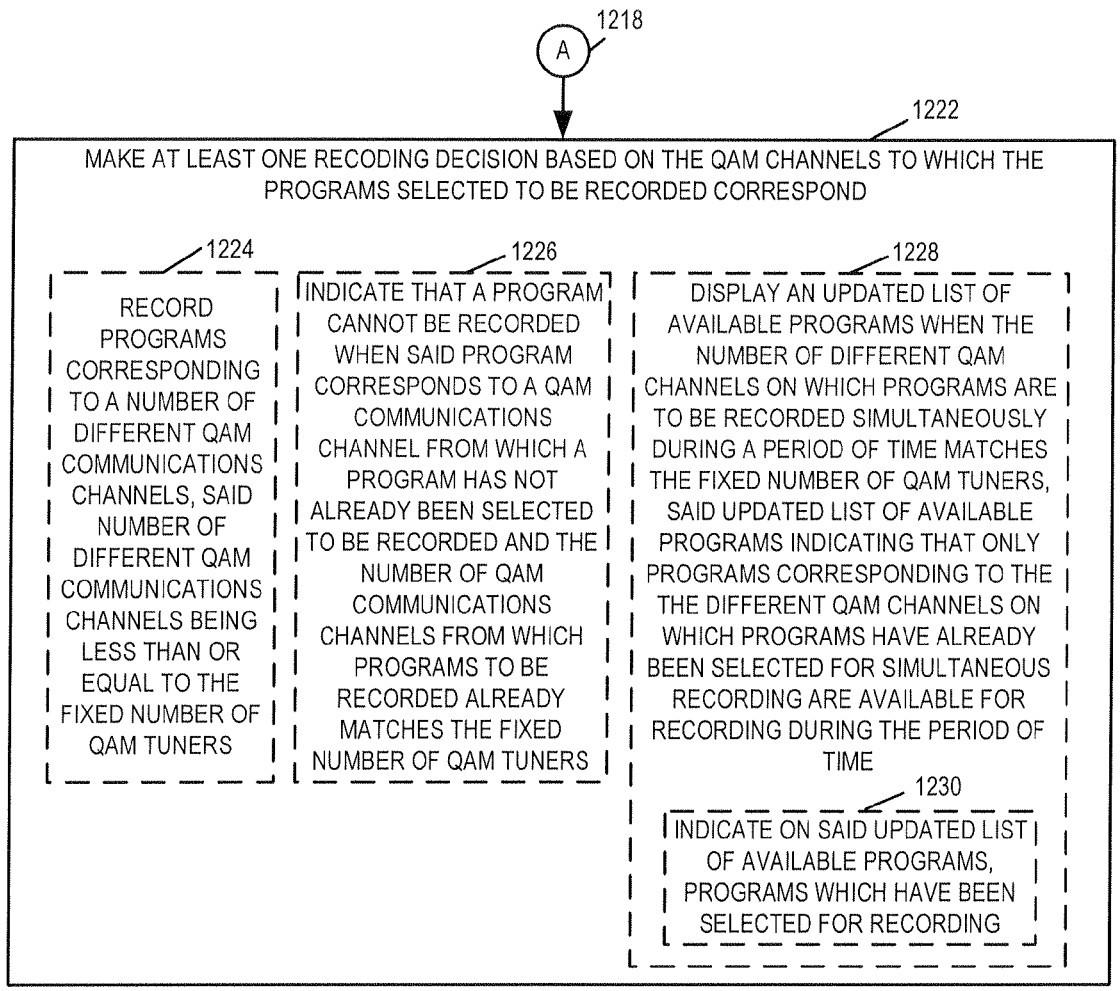
FIG. 12B is a drawing of a flowchart of an exemplary method of operating a system used for recording and playback of programs in accordance with the present invention.

FIG. 12 comprising the combination of FIG. 12A and FIG. 12B is a drawing of a flowchart 1200 of an exemplary method of operating a system used for recording and playback of programs. In some embodiments, the exemplary system includes a fixed number of QAM tuners capable of tuning to different QAM channels. For example, the system is, in some embodiments, an end user system including a set top box with a fixed number of QAM tuners, e.g., one or two QAM tuners. In some such embodiments, the end user system includes a remote control interface, a display device, and a digital recording device. The digital recording device may be, and sometimes is, included as part of the set top box. Operation starts in step 1202, where the system is powered on and initialized and proceeds to step 1204. In step 1204, program to QAM mapping information is received. In some embodiments, the program to QAM channel mapping information is communicated with program guide information. Operation proceeds from step 1204 to step 1206.

In step 1206, a first group indicator indicating a group of programs available for simultaneous recording is included in a display list, said first group of programs corresponding to a first QAM communications channel. Operation proceeds from step 1206 to step 1208. In step 1208, a second group indicator indicating a group of programs available for simultaneous recording is included in said display list of available programs, said second group of programs corresponding to a second QAM communications channel. In some embodiments, the first and second group indicators are colors on the display used to distinguish different groups of programs which can be recorded simultaneously from one another. Operation proceeds from step 1208 to step 1210. In step 1210, a third group indicator indicating a group of programs available for simultaneous recording is included in said display list of available programs, said third group of programs corresponding to a third QAM communications channel.

Then, in step 1212, the display list of available programs is displayed. Operation proceeds from step 1212 to step 1214. In step 1214, a plurality of requests to record programs during a first period of time is received. Operation proceeds from step 1214 to step 1216, in which the QAM channels to which the programs requested to be recorded corresponds is determined. Operation proceeds from step 1216 via connecting node A 1218 to step 1222.

In step 1222, at least one recording decision based on the QAM channels to which the programs selected to be recorded corresponds is made. In some embodiments, step 1222 includes one or more of sub-steps 1224, 1226 and 1228. In sub-step 1224, programs are recorded corresponding to a number of different QAM communications channels, said number of different QAM communications channels being less than or equal to the fixed number of QAM tuners. In sub-step 1226, an indication is made that a program cannot be recorded when said program corresponds to a QAM communications channel from which a program has not already been selected to be recorded and the number of QAM communications channels from which programs to be recorded already matches the fixed number of QAM tuners. In sub-step 1228, an updated list of available programs is displayed when the number of different QAM communication channels on which programs are to be recorded during a period of time matches the mixed number of QAM tuners, said updated list of available programs indicating that only programs corresponding to the different QAM channels on which programs have already been selected for simultaneous recording are available for recording during the period of time. Sub-step 1228 includes, in some embodiments, sub-step 1230. In sub-step 1230, on said updated list of available programs, programs are indicated which have been selected for recording.

Figure 13A:
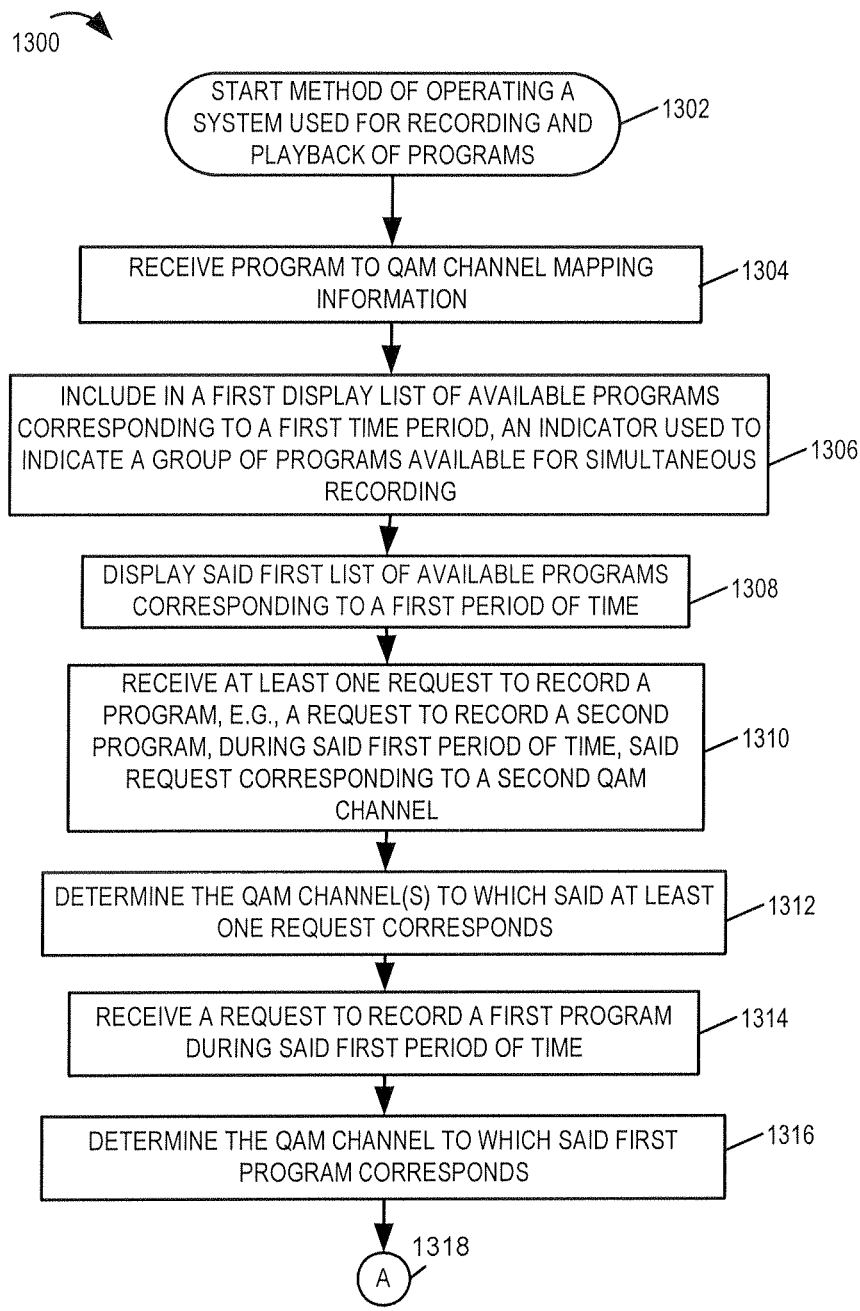
FIG. 13 comprising the combination of FIG. 13A
FIG. 13B is a drawing of a flowchart of an exemplary method of operating a system used for recording and playback of programs in accordance with the present invention.
Figure 13B:
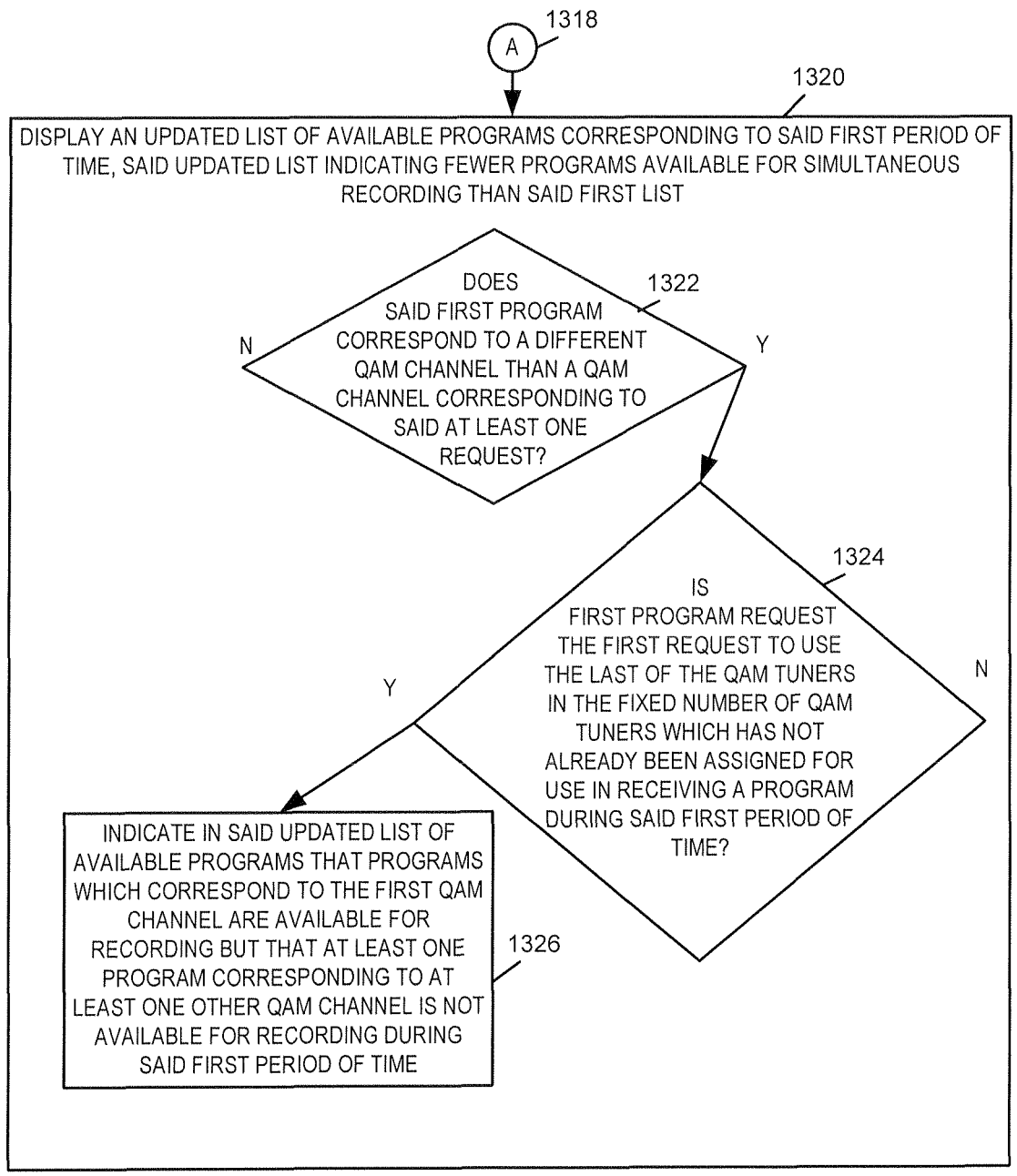

FIG. 13 comprising the combination of FIG. 13A and FIG. 13B is a drawing of a flowchart 1300 of an exemplary method of operating a system used for recording and playback of programs in accordance with the present invention. The exemplary system is, e.g., a customer premise system. In some such embodiments, the system includes a set top box including a fixed number of QAM tuners and a display device. Operation starts in step 1302, where the system is powered on and initialized and proceeds to step 1304. In step 1304, the system receives program to QAM mapping information. Operation proceeds from step 1304 to step 1306. In various embodiments, the program to QAM mapping information is communicated with program guide information.

In step 1306, the system includes in a first display list of available programs corresponding to a first time period an indicator used to indicate a group of programs available for simultaneous recording. Operation proceeds from step 1306 to step 1308. In step 1308, the system displays said first list of available programs corresponding to a first period of time. Operation proceeds from step 1308 to step 1310.

In step 1310, the system receives at least one request to record a program, e.g., a request to record a second program, during said first period of time, said request corresponding to a second QAM channel. Then, in step 1312, the system determines the QAM channel(s) to which said request corresponds.

Next, in step 1314, the system receives a request to record a first program during said first period of time, and in step 1315, the system determines the QAM channel to which the first program corresponds. Operation proceeds from step 1316 via connecting node A 1318 to step 1320.

In step 1320, the system displays an updated list of available programs corresponding to said first period of time, said updated list including fewer programs available for simultaneous recording than said first list. Step 1320 includes sub-steps 1322, 1324 and 1326.

In sub-step 1322, the system determines whether the first program corresponds to a different QAM channel than the QAM channel corresponding to said at least one request. If the first program does correspond to a different QAM channel, then operation proceeds from sub-step 1322 to sub-step 1324. In sub-step 1324, the system determines if the first program request is the first request to use the last of the QAM tuners in the fixed number of QAM tuners in the system which has not already been assigned for use in receiving a program during said first period of time. If it is determined in sub-step 1324, that the first program request uses up the last of the QAM tuners, then operation proceeds to sub-step 1326. In sub-step 1326, the system indicates in the updated list of available programs that programs which correspond to the first QAM channel are available for recording but that at least one program corresponding to at least one other QAM channel is not available for recording during said first period of time.

In various embodiments, in the update list, programs corresponding to the same QAM channel to which the first program corresponds are indicated as being available for simultaneous recording during the first period of time. In some such embodiments, the number of programs indicated to be available for simultaneous recording by said system exceeds the fixed number of QAM tuners available for tuning to different QAM channels during said first period of time.

Figure 14:
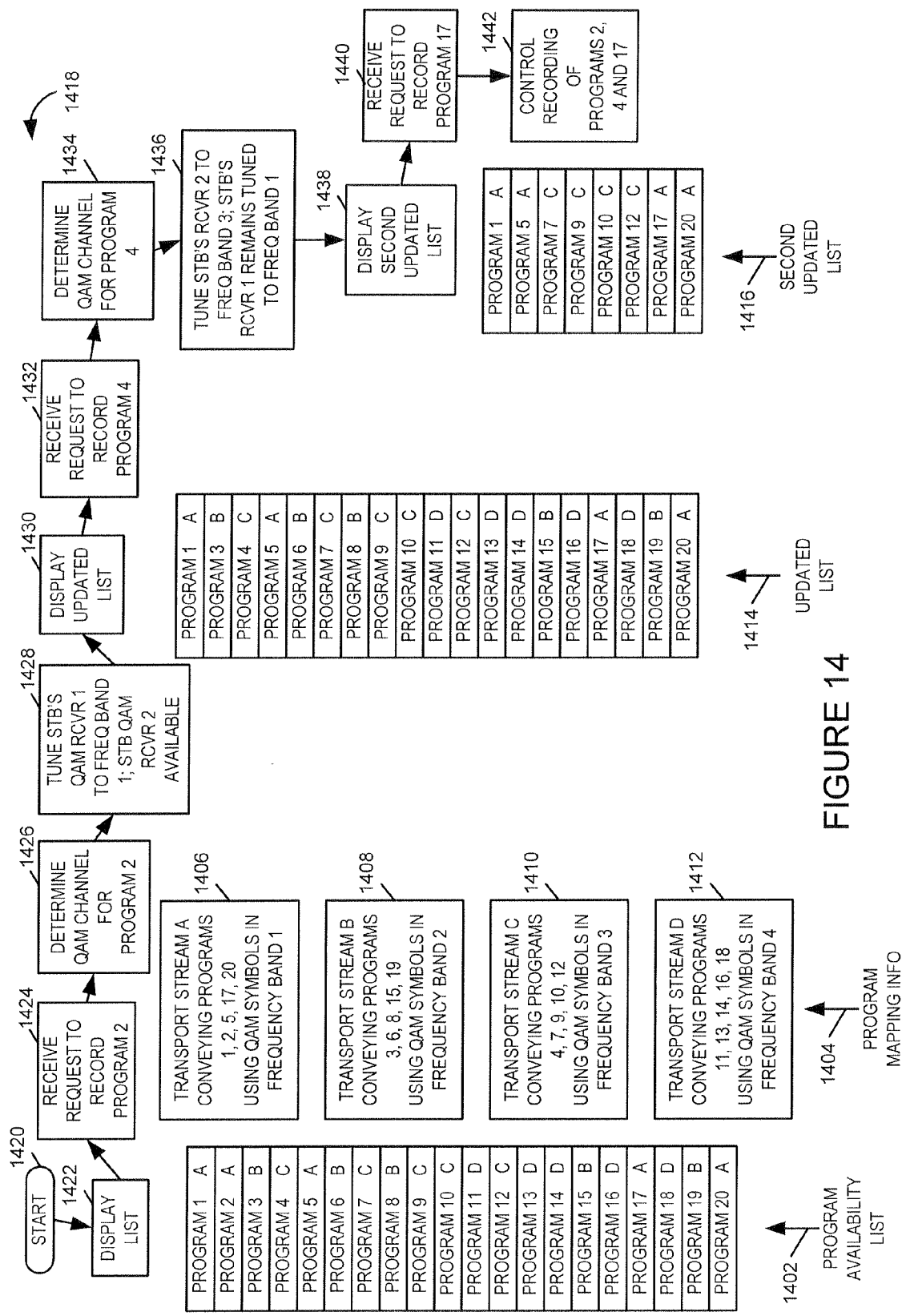
FIG. 14 is a drawing illustrating exemplary updated program lists in response to user selections of programs to be recorded, the generation of the updated programs lists taking into consideration the number of QAM tuners in the set top box, the tuning status of the QAM receivers, and program to QAM channel mapping information.

FIG. 14 is a drawing including an exemplary initial program availability listing 1402, exemplary program mapping information 1404, an exemplary updated list 1414, an exemplary second updated list 1416, and an exemplary flowchart 1418 in accordance with various embodiments of the present the invention. Consider that a cable service provider has a number of programs or program channels that are available concurrently. Program availability list 1402 identifying 20 programs is an exemplary list of available concurrent programs being broadcast. The service provider is broadcasting the programs to be available at a customer's set top box. As part of the broadcasting implementation, the service provider associates groups of programs with different transport streams, e.g., MPEG-2 transport streams, and multiplexes packets of program information from an associated group of programs into the transport stream. In addition as part of the broadcasting implementation, each transport stream conveying a group of programs is communicated using QAM symbols in a different frequency band.

Program mapping information 1404 identifies the exemplary association between programs, transport streams, and QAM frequency bands. In this example, each transport stream conveys 5 programs. In other embodiments, a transport stream may convey a different number of programs. In some embodiments, different transports streams convey different numbers of programs. Block 1406 identifies that transport stream A conveys programs 1, 2, 5, 17, and 20 using QAM symbols in frequency band 1. Block 1408 identifies that transport stream B conveys programs 3, 6, 8, 15, and 19 using QAM symbols in frequency band 2. Block 1410 identifies that transport stream C conveys programs 4, 7, 9, 10, and 12 using QAM symbols in frequency band 3. Block 1412 identifies that transport stream D conveys programs 11, 13, 14, 16, and 18 using QAM symbols in frequency band 4.

Corresponding to each of the programs, the list 1402, in this embodiment, also includes information associating the program with a transport stream into which the program is mapped and QAM frequency band into which the transport stream is communicated. In this example, a letter is used to indicate the mapping. In other embodiments, color coding or different symbols are used to indicate mapping. In some embodiments, the lists presented to the user do not include information identifying the mapping.

Flowchart 1418 is a flowchart of an exemplary method of an example of operating a set top box implemented with two embedded QAM receivers in accordance with various embodiments. Operation starts in step 1420, where the STB is powered on and initialized, and proceeds to step 1422. In step 1422, the set top box presents the user with a program availability list. The program availability list, in this example, includes information associating programs with transport stream groupings, e.g., list 1402 including 20 programs with group association information. Operation proceeds from step 1422 to step 1424. In step 1424, the set top box receives a user request to record program 2. Then, in step 1426 the STB determines the QAM channel for program 2 and in step 1428 the STB tunes its QAM receiver #1 to frequency band 1. At this time the STB's QAM receiver #2 is available. Operation proceeds from step 1428 to step 1430. In step 1430 the STB displays updated list 1414 identifying programs that can be recorded. Then, in step 1432, the STB receives a user request to record program 4. Operation proceeds from step 1432 to step 1434, in which the STB determines the QAM channel for program 4. Then, in step 1436, the STB tunes its receiver #2 to frequency band 3. At this time the STB's receiver #1 remains tuned to frequency band 1. Operation proceeds from step 1436 to step 1438. In step 1438, the STB displays a second updated list 1416, identifying programs which can be selected to be recorded. Note that since both of the STB's QAM receivers are tuned and no additional QAM receivers are in the STB, the second updated list only includes programs corresponding to transport stream A using QAM symbols in frequency band 1 and programs corresponding to transport stream C using QAM symbols in frequency band 3. Operation proceeds from step 1438 to step 1440. In step 1440, the STB receives a request to record program 17. Operation proceeds from step 1440 to step 1442. In step 1442, the STB controls recording of programs 2, 4, and 17. In some embodiments, the STB includes the recording device used to record the selected programs. Note that, in accordance with a feature of various embodiments of the present invention, the STB is able to record a larger number of programs being broadcast simultaneously than the number of QAM receivers included in the STB.

Figure 15:
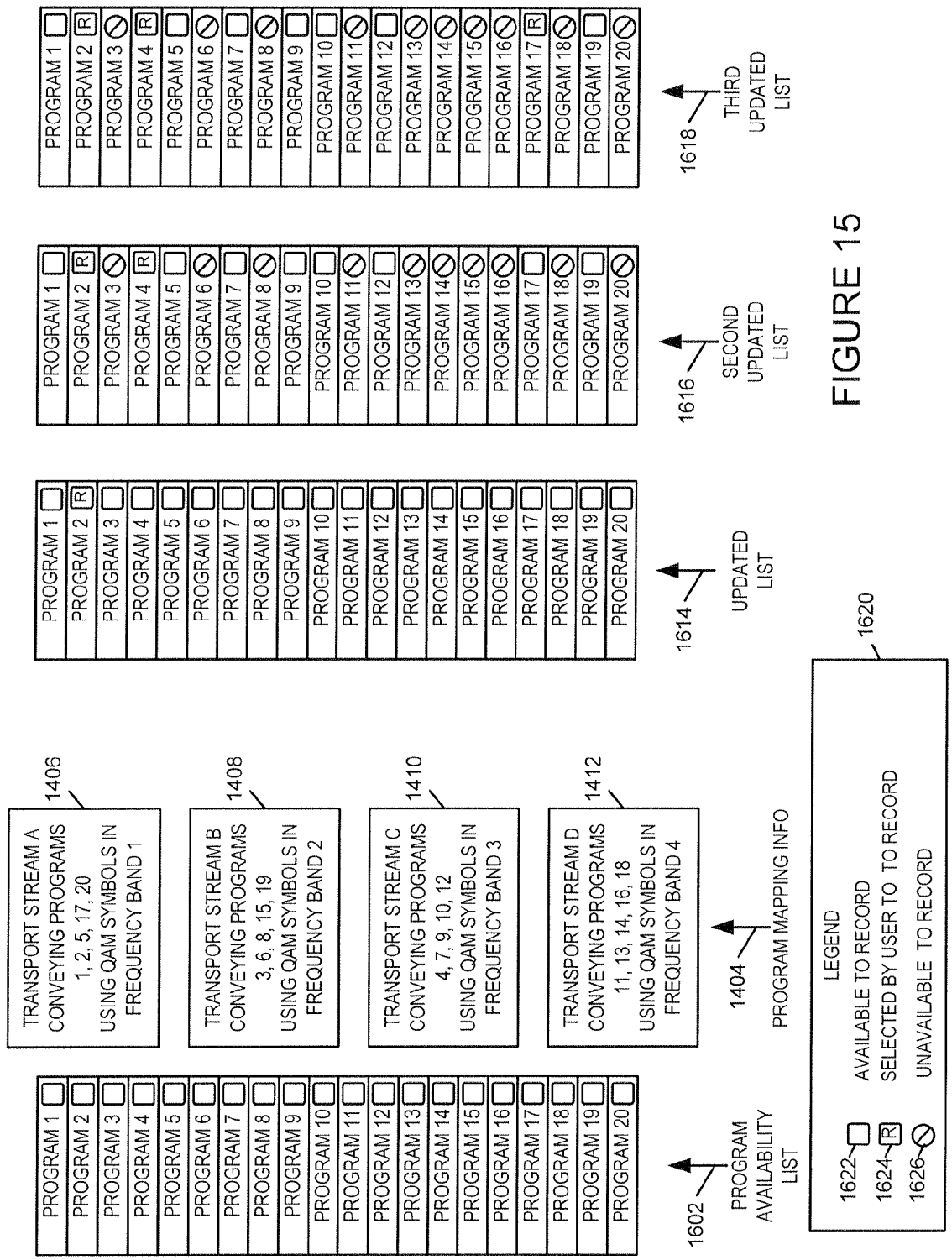
FIG. 15 is a drawing illustrating exemplary updated program lists in response to user selections of programs to be recorded, the generation of the updated programs lists taking into consideration the number of QAM tuners in the set top box, the tuning status of the QAM receivers, and program to QAM channel mapping information.

FIG. 15 is a drawing including an exemplary initial program availability listing 1602, exemplary program mapping information 1404, an exemplary updated list 1614, an exemplary second updated list 1616, an exemplary third updated list 1618 and legend 1620 in accordance with various embodiments of the present the invention. FIG. 15 illustrates exemplary alternative display format to that of the display lists of the example of FIG. 14. Legend 1620 identifies that in the program display lists of FIG. 15: (i) blank box symbol 1622 indicates that a program is available to record; (ii) boxed R symbol 1624 indicates that a program has been selected to be recorded by the user; and (iii) circle including a slash symbol 1626 indicates that a program is unavailable to record. Consider that a cable service provider has a number of programs or program channels that are available concurrently. Program availability list 1602 identifying 20 programs is an exemplary list of available concurrent programs being broadcast. The service provider is broadcasting the programs to be available at a customer's set top box. As part of the broadcasting implementation, the service provider associates groups of programs with different transport streams, e.g., MPEG-2 transport streams, and multiplexes packets of program information from an associated group of programs into the transport stream. In addition as part of the broadcasting implementation, each transport stream conveying a group of programs is communicated using QAM symbols in a different frequency band.

Assume that the exemplary program to QAM communications channel mapping is the same as with respect to the example of FIG. 14. Program mapping information 1404 identifies the exemplary association between programs, transport streams, and QAM frequency bands. In this example, each transport stream conveys 5 programs. In other embodiments, a transport stream may convey a different number of programs. In some embodiments, different transports streams convey different numbers of programs. Block 1406 identifies that transport stream A conveys programs 1, 2, 5, 17, and 20 using QAM symbols in frequency band 1. Block 1408 identifies that transport stream B conveys programs 3, 6, 8, 15, and 19 using QAM symbols in frequency band 2. Block 1410 identifies that transport stream C conveys programs 4, 7, 9, 10, and 12 using QAM symbols in frequency band 3. Block 1412 identifies that transport stream D conveys programs 11, 13, 14, 16, and 18 using QAM symbols in frequency band 4.

Consider that an exemplary set top box is implemented with two embedded QAM receivers, and that the user performs the same selections as in the example of FIG. 14. The set top box presents the user with a program availability list 1602, which indicates that the 20 programs are available to be recorded. The set top box receives a user request to record program 2. The STB determines the QAM channel for program 2, and the STB tunes its QAM receiver #1 to frequency band 1. At this time the STB's QAM receiver #2 is available. The STB displays updated list 1614 identifying that program 2 has been selected to be recorded and identifying that the user can additionally select any one of the 19 other programs to record. The STB receives a user request to record program 4, and the STB determines the QAM channel for program 4. The STB tunes its receiver #2 to frequency band 3. At this time the STB's receiver #1 remains tuned to frequency band 1. The STB displays a second updated list 1616, identifying that programs 2 and 4 have been selected to be recorded, that programs 3, 6, 8, 11, 13, 14, 15, 16, 18 and 20 are unavailable to record, and that the user can additionally select any one of programs 1, 5, 7, 9, 10, 12, 17 and 19 to record. Note that since both of the STB's QAM receivers are tuned and no additional QAM receivers are in the STB, the second updated list only designates programs corresponding to transport stream A using QAM symbols in frequency band 1 and programs corresponding to transport stream C using QAM symbols in frequency band 3, which have not been yet selected as available to record. Programs corresponding to transport stream B/frequency band 2 and transport stream D/frequency band 4 are designated as unavailable. The STB receives a request to record program 17, and the STB generates and displays a third updated program list 1618. The third updated list 1618, identifying that programs 2, 4, and 17 have been selected to be recorded, that programs 3, 6, 8, 11, 13, 14, 15, 16, 18 and 19 are unavailable to record, and that the user can additionally select any one of programs 1, 5, 7, 9, 10, 12 and 19 to record. The STB controls recording of programs 2, 4, and 17. In some embodiments, the STB includes the recording device used to record the selected programs. Note that, in accordance with a feature of various embodiments of the present invention, the STB is able to record a larger number of programs being broadcast simultaneously than the number of QAM receivers included in the STB.

Figure 16:
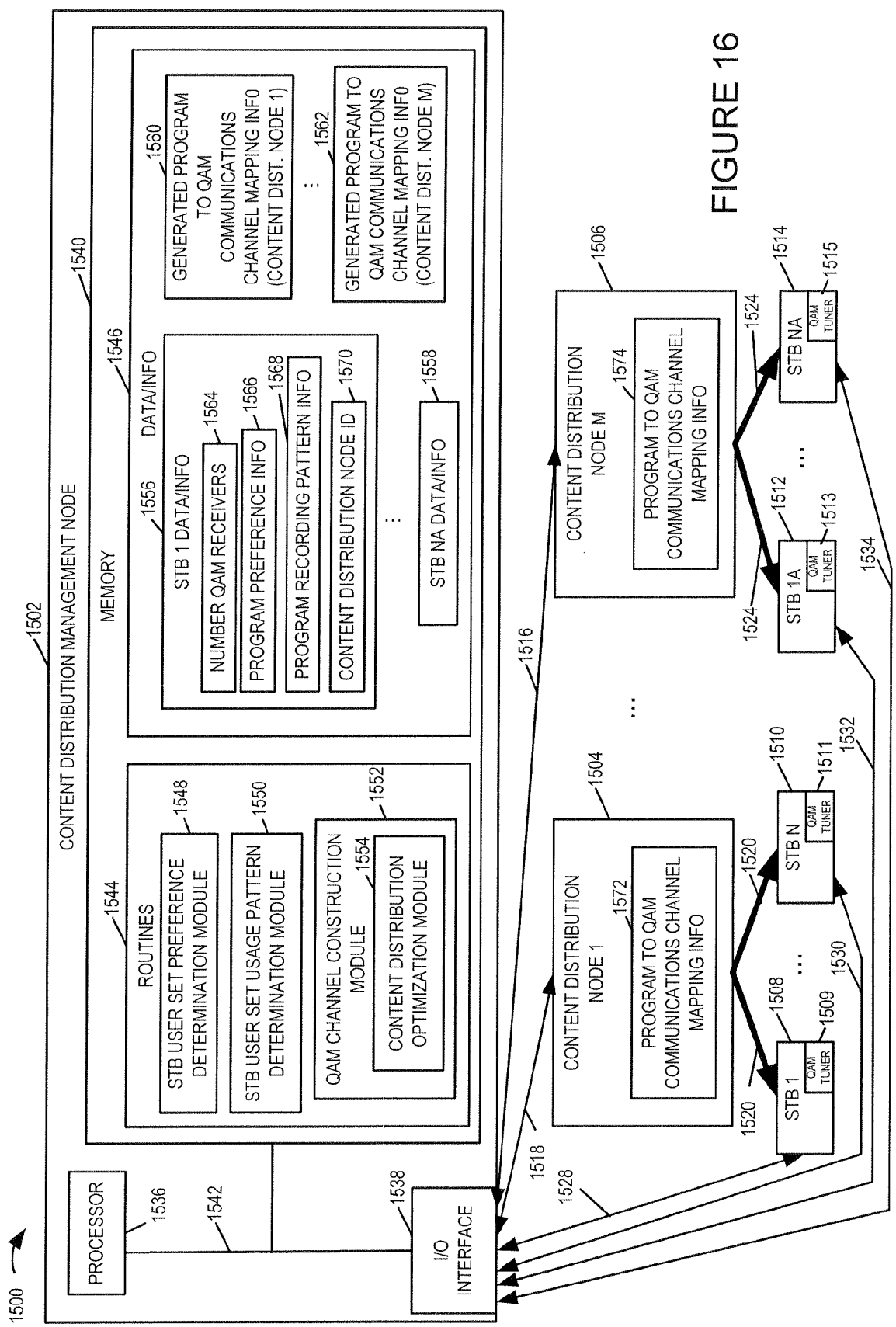
FIG. 16 is a drawing of an exemplary content distribution system in which program to QAM communications channel mapping is customized on a per content distribution node basis in accordance with various embodiments of the present invention.

FIG. 16 is a drawing of an exemplary content distribution system 1500 in accordance with various embodiments of the present invention. Exemplary content distribution system 1500 is, e.g., a cable provider content distribution system including the delivery of program content including movies, sports programs and television programs. Exemplary content distribution system 1500 includes a content distribution management node 1502, a plurality of content distribution nodes (content distribution node 1 1504, . . . , content distribution node M 1506). Exemplary system 1500 also includes sets of set top boxes corresponding to each of the content distribution nodes. Set top boxes (STB 1 1508, . . . , STB N 1510) correspond to content distribution node 1 1504. Set top boxes (STB 1A 1512, . . . , STB NA 1514) correspond to content distribution node M 1506.

Content distribution management node 1502 includes a processor 1536, an I/O interface 1538 and memory 1540 coupled together via a bus 1542 via which the various elements may interchange data and information. I/O interface 1538 couples the content distribution management node 1502 to the content distribution nodes (1504, . . . , 1506) and the STBs (1508, . . . , 1510, 1512, . . . , 1514), and to other network nodes, e.g., program content source nodes, billing nodes, etc. Memory 1540 includes routines 1544 and data/information 1546. The processor 1536, e.g., a CPU, executes the routines 1544 and uses the data/information 1546 in memory 1540 to control the operation of the content distribution management node 1502 and implement methods in accordance with the present invention.

Routines 1544 include a set top box user set preference determination module 1548, a set top box user set usage pattern determination module 1550, and a QAM channel construction module 1552. QAM channel construction module 1552 includes a content distribution optimization module 1554. Data/information 1546 includes a plurality of sets of information corresponding to the set top boxes being managed by node 1502 (STB 1 data/information 1556, . . . , STB NA data/information 1558).

STB 1 data/information 1556 includes a number of QAM receivers 1564, program preference information 1566, program recording pattern information 1568 and content distribution node identification information 1570. Number of QAM receivers 1564 identifies the number of QAM receivers in STB 1 1508 thus identifying the maximum number of QAM communications channels to which STB 1 1508 can be tuned simultaneously and receive program content being carried by those simultaneously tuned-in channels. Program preference information 1566 includes, for example, information identifying a user preference for one or more types of programs, e.g., sports, western movies, action movies, game shows, etc. Program recording pattern information 1568 includes information identifying types of programs recorded, times programs recorded, numbers of concurrent programs recorded, and/or other pattern information. Content distribution node ID 1570 identifies that STB 1 1508 is serviced by content distribution node 1 1504. Data/information 1546 also includes a plurality of sets of program to QAM channel mapping information corresponding to the various content distribution nodes being managed by node 1502 (generated program to QAM communications channel mapping information for content distribution node 1 1560, . . . , generated program to QAM communications channel mapping information for content distribution node M 1562).

STB user set preference determination module 1548 determines, on a per content distribution node basis, aggregated user program preference information. STB user set usage pattern determination module 1550 determines, on a per content distribution node basis, usage pattern information. Usage pattern information includes, e.g., information identifying times of usage, numbers of programs recorded, types of programs recorded, congestion time intervals, etc. QAM channel construction module 1552 generates, on a per content distribution node basis, a set of program to QAM communications channel mapping information. Program to QAM communications channel mapping information (1560, . . . , 1562) represent outputs of module 1552. Content distribution optimization module 1552 utilizes information from preference determination module 1548 and usage pattern determination module 1550 to beneficially group programs into a QAM content stream.

The generated program to QAM communications channel mapping information corresponding for content distribution node 1 1560 is sent to content distribution node 1 1504, via link 1518, where it is stored as program to QAM communications channel mapping information 1572. The generated program to QAM communications channel mapping information corresponding for content distribution node M 1562 is sent to content distribution node M 1506, via link 1516, where it is stored as program to QAM communications channel mapping information 1574.

Content distribution node 1 1504 uses the stored program to QAM communications channel mapping information 1572 to generate and output a plurality of different transport streams, e.g., MPEG-2 transport streams, different transport streams being carried by different QAM signals corresponding to different frequency bands. The plurality of output QAM communications channels are available to the set of STBs (1508, . . . 1510). A particular STB, e.g., STB 1 1508 tunes one of its QAM receivers to select a particular QAM communications channel and be able to record a plurality of programs being broadcast concurrently and being carried by that selected QAM channel.

Content distribution node M 1506 uses the stored program to QAM communications channel mapping information 1574 to generate and output a plurality of different transport streams, e.g., MPEG-2 transport streams, different transport streams being carried by different QAM signals corresponding to different frequency bands. The plurality of output QAM communications channels are available to the set of STBs (1512, . . . 1514). A particular STB, e.g., STB 1A 1512 tunes one of its QAM receivers to select a particular QAM communications channel and be able to record a plurality of programs being broadcast concurrently and being carried by that QAM channel.

Program to QAM communications channel mapping information is customized to fit the set of users being serviced by a particular content distribution node, e.g., in terms of hardware available at the customer site, user preferences, and/or observed user patterns. For example, if at one node, it is observed that users corresponding to a content distribution node have a tendency toward recording particular concurrent sporting events, in some embodiments, programs corresponding to those events, are mapped to the same QAM communications channel. For example, the set of concurrent sporting events may be a particular set of college football games. As another example, if it is determined that a group of STB users corresponding to a content distribution node would like to be able to record a plurality of soap operas which are broadcast concurrently with cartoons, a mixture of soap opera programs and cartoons are intentionally mapped into the same QAM communications channel. Thus, the program to QAM channel mapping can be optimized, on a per content distribution node basis, to allow a group of users to be able to record a higher number of desired programs being broadcast concurrently than would be otherwise possible if a fixed program to QAM communications channel mapping was implemented in the system. Advantageously, if at least some of the programs desired to be recorded are pay per view programs, such an implementation can increase service provider revenues.

Output 1520 from content distribution node 1 1504 represents a plurality of QAM communications channels available for selection by the STBs (1508, . . . , 1510). QAM tuner 1509 in STB 11508 tunes to select a particular QAM channel. QAM tuner 1511 in STB N 1510 tunes to select a particular QAM channel. Output 1524 from content distribution node M 1506 represents a plurality of QAM communications channels available for selection by the STBs (1512, . . . , 1514). QAM tuner 1513 in STB 1A 1512 tunes to select a particular QAM channel. QAM tuner 1515 in STB NA 1514 tunes to select a particular QAM channel. STB 11508 and STB 1A 1512 may, and sometimes are, tune to the same frequency band, yet receive different programming.

The STBs ((1508, . . . , 1510), . . . (1512, . . . , 1514)) communicate with the content distribution management node as indicated by arrows ((1528, . . . , 1530), . . . , (1532, . . . 1534), respectively. The STBs communicate program selection information, program recording information, program preference information and/or billing information. Such collected information is utilized by management module 1502 in determining user set preference information and user set pattern information. In some embodiments recording information is collected on, e.g., a per household and/or per customer basis with the information being communicated to and stored in, the content distribution management node 1502. This information is then used to determine future program to communications channel mappings, i.e., the information is used to modify the program to channel mappings even if it is not used to alter the total line up of programs which are to be delivered during a particular time slot. When receiving information that a program is being recorded, in one exemplary embodiment the content distribution management node stores information indicating the household and/or customer making the recording, the device and/or tuner being used to make the recording, the program channel to which the program being recorded corresponds and the QAM communications channel to which the program corresponds. This information is collected for multiple customers and/or households and then used to adjust future program to QAM channel mappings in order to increase the probably that one or more households will be able to record more programs of interest at the same time using fewer tuners and/or devices than would be possible without updating program to channel mapping information. For this reason, information on the number of tuners and/or devices used to make the recordings by a given household or user is stored so that the program to channel mapping can be adjusted to increase the probability that programs of interest to individual households will be grouped in such a manner that they can be recorded using less tuners than the number of programs to be recorded and/or viewed at a given time. Consider for example if the stored recording information indicates that during week one, each of one or more households each simultaneously recorded television programs 1, 2 and 3 using 3 distinct tuners and/or devices since each of the programs corresponded to different QAM communications channels. In accordance with the invention, in analyzing this information, it would be determined that weekly television programs 1, 2, and 3 should be mapped to the same QAM communications channel in future weeks so that episodes corresponding to the three weekly television programs can be recorded simultaneously using a single tuner and/or recording device as opposed to 3 distinct tuner's previously necessitated by the fact that different QAM channels had been used to deliver the 3 programs. Thus, in one such embodiment, in week two, programs 1, 2 and 3 would be mapped to the same QAM communications channel allowing the households to record all 3 programs simultaneously using a single tuner and/or recording device. As should be appreciated, information on programs which are not recorded simultaneously in individual households can also be stored and used to adjust future program to QAM communications channel mappings. In order to make the television to channel mapping adjustments, in some embodiments weekly programs or other programs which are not detected as being recorded simultaneously by one or more households or users may be moved from a single QAM communications channel to different QAM channels for delivery. For example, if in week 1 it is detected that no individual household or user records both of two 7pm news broadcasts which share the same time slot and are communicated in week 1 using the same communications channel, rather than group these news broadcasts together in a QAM communications channel during future weeks they will be allocated to different QAM channels allowing, e.g., TV sitcoms which also share the 7pm time slot and which were detected as being recorded by at least one individual household or user at the same time, to be grouped together in the same QAM channel previously occupied by, e.g., the news programs which were not detected as being recorded at the same time by an individual user or household. Thus, while the sitcoms and news broadcasts continue in the 7pm time slot, the alteration of the program to QAM communications channel mapping allows both sitcoms to be recorded using a single tuner and/or recording device while previously two tuners would have been required due to the use of different QAM channels being used to deliver the sitcoms. Thus, in accordance with the invention updating of program to channel mappings can be optimized based on local and/or regional recording statistics. In this manner, the program to communications channel mappings can be determined locally in a manner that takes into consideration a particular geographic region's past viewing and recording of recurring programs, e.g., TV sitcoms, news programs, regular sports shows, etc., which recur on a regular basis, albeit with different episodes being shown from one occurrence to the next. As a result of using regional or local recording information, the program to QAM channel lineups may, and often do, vary at different content distribution nodes and may be updated at different times as the recording information indicates particular recording patterns in a given region. Changes in program to QAM channel mappings are communicated to the STBs so that they remain able to tune to the appropriate QAM channel in response to a user selecting a particular program. While the changes are intended to facilitate the recording of multiple programs simultaneously, it is possible that a change in the program to QAM channel mapping may result in a user who previously selected multiple programs to record corresponding to a single QAM channel no longer being able to record the selected programs due to the programs being reallocated to different QAM channels. In one embodiment, the STB monitors for changes in program to QAM channel mappings, checks in response to detecting a change if previously selected programs can still be recorded given the particular STB's hardware capabilities, e.g., number of tuners. When it is determined that multiple programs previously corresponding to a single QAM channel but now corresponding to multiple QAM channels can not be recorded due to the lack of an additional available tuner, a notification is generated and presented, e.g., displayed, to the user indicating that the user's previous recording selection is no longer valid and that the user must update his/her recording selection due to a change in content delivery, e.g., a change in program to QAM channel mappings.

In various embodiments system elements described herein are implemented using one or more modules which are used to perform the steps corresponding to one or more methods of the present invention, for example, request processing, content to stream assignment, content recovery, multiplexing, demultiplexing, display generation, recording of multiple programs in a QAM channel, etc. Such modules may be implemented using software, hardware or a combination of software and hardware. Each step may be performed by one or more different software instructions executed by a processor, e.g., CPU.

At least one system implemented in accordance with the present invention includes a means for implementing the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating a recording and playback device including at least a first receiver, the method comprising:
receiving user input identifying a first program selected by a user of the device;
determining a first communications channel used to communicate said first program;
operating the first receiver to receive a first channel signal from said first channel while said first channel is used to communicate said first program;
recovering from received first channel signal packets corresponding to said user selected first program and packets corresponding to a second program which has not been selected by the user of the device;
recording at least some of said recovered packets corresponding to the second program;
receiving user input relating to playback of a program; and
generating billing information based on the output of decoded information generated from the recovered second program packets to an output device.

2. The method of claim 1, further comprising:
communicating the billing information to another device for processing.

3. The method of claim 1, further comprising:
outputting decoded information generated from said recovered first program packets to an output device during at least a portion of time during which said step of recording at least some of said recovered packets corresponding to the second program is performed.

4. The method of claim 1, wherein recording at least some of said recovered packets corresponding to the second program is performed as part of:
recording at least some packets from each of a plurality of programs communicated on said first communications channel while said first communications channel is used to communicate said first program.

5. The method of claim 1, further comprising:
presenting the user with a list of programs received over the first communications channel which are available for playback, at least a portion of at least one program on said list having been communicated to said device during a period of time during which said first channel was used to communicate said first program.

6. The method of claim 1, further comprising:
communicating said billing information to a network device for processing.

7. The method of claim 1, wherein said recording and playback device includes at least a second receiver in addition to said first receiver, the method comprising:
receiving user input identifying another program selected by a user of the device;
operating the second receiver to receive a second channel signal from said a second channel while said first channel signal is being received by said first receiver;
recovering from received second channel signal packets corresponding to said another program and packets corresponding to a third program; and
recording at least some of said recovered packets corresponding to the third program.

8. The method of claim 2, further comprising:
recording at least some recovered packets corresponding to the first program; and
wherein said first communications channel is a QAM communications channel capable of communicating multiple programs.

9. The method of claim 8, wherein said recording and playback device is a set top box.

10. The method of claim 8, wherein said recording and playback device includes a set top box coupled to a digital video recorder.

11. The method of claim 8, wherein said first communications channel communicates a MPEG 2 transport stream.

12. The method of claim 8, wherein said multiple programs is at least 5, and wherein the number of programs whose packets are being recorded is more than the number of QAM receivers included in said recording and playback device.

13. The method of claim 11, wherein at least one of said multiple programs comprises a plurality of MPEG-2 elementary streams.

14. The method of claim 3, further comprising, prior to recording at least some of said recovered packets corresponding to the second program:
receiving user input indicating selection of said second program by said user.

15. The method of claim 14, further comprising, prior to receiving user input indicating selection of said second program:
presenting to the user a list of at least some programs communicated using said first communications channel.

16. The method of claim 5, further comprising:
removing a program for which said user has not been charged, from said list of programs in response to a program retention timer expiring.

17. The method of claim 16, wherein said program retention timer indicates an amount of time a recorded program is to be retained without having been selected by said user.

18. The method of claim 16, wherein said storage constraint is a constraint on the amount of storage space available for program storage.

19. The method of claim 16, further comprising:
removing a program for which said user has not been charged, from said list of programs in response to a storage constraint having been reached.

20. A recording and playback apparatus, comprising:
a user input module for receiving user input identifying a first program selected by a user of the apparatus;
a channel determination module for determining a first communications channel used to communicate said first program;
a first receiver for receiving a first channel signal from said first channel while said first channel is used to communicate said first program;
a packet recovery module for recovering from received first channel signal packets corresponding to said user selected first program and packets corresponding to a second program which has not been selected by the user of the apparatus;
a recording module; and
a recording control module for controlling the recording module to record at least some of said recovered packets corresponding to the second program; and
a billing information generation module for generating billing information based on output of decoded information generated from said recovered second program packets to an output device.

21. The apparatus of claim 20, wherein said recording control module controls said recording module to record at least some recovered packets corresponding to the first program.

22. The apparatus of claim 20, further comprising:
a decoder for decoding information generated from said recovered first program packets; and
an output module for outputting decoded information generated from said recovered first program packets to an output device during at least a portion of time during which said step of recording at least some of said recovered packets corresponding to the second program is performed.

23. The apparatus of claim 20, wherein said recording control module controls recording of at least some of said recovered packets corresponding to the second program to be performed as part of:
recording at least some packets from each of a plurality of programs communicated on said first communications channel while said first communications channel is used to communicate said first program.

24. The apparatus of claim 20, further comprising:
a presentation module for presenting the user with a list of programs received over the first communications channel which are available for playback, at least a portion of at least one program on said list having been communicated to said apparatus during a period in time during which said first channel was used to communicate said first program.

25. The apparatus of claim 21,
wherein said first receiver is a QAM receiver; and
wherein said first communications channel is a QAM communications channel capable of communicating multiple programs.

26. The apparatus of claim 25, wherein said apparatus is a set top box.

27. The apparatus of claim 25, wherein said apparatus includes a set top box coupled to a digital video recorder.

28. The apparatus of claim 25, wherein said first communications channel communicates a MPEG 2 transport stream; the apparatus further comprising:
a demultiplexer for separating packets recovered by said packet recovery module corresponding to different programs communicated over said first communications channel into different streams.

29. The apparatus of claim 25, wherein said multiple programs includes at least 5 programs, and wherein said apparatus includes at least one additional QAM receiver, the total number of QAM receivers included in said recording and playback device being less than the number of programs communicated together by said first QAM channel.

30. The apparatus of claim 28, wherein at least one of said multiple programs comprises a plurality of MPEG-2 elementary streams.

31. The apparatus of claim 22, wherein said user input module receives, prior to recording at least some of said recovered packets corresponding to the second program, user input indicating selection of said second program by said user.

32. The apparatus of claim 31, further comprising:
a presentation module for presenting to the user a list of at least some programs communicated using said first communications channel prior to receiving user input indicating selection of said second program.

33. The apparatus of claim 24, further comprising:
a data storage management module for removing a program, for which said user has not been charged, from said list of programs in response to a program retention timer expiring.

34. The apparatus of 24, further comprising:
a data storage management module for removing a program from said list of programs in response to a storage constraint having been reached.

* * * * *